United States Patent
Kaneshige

(10) Patent No.: US 7,257,059 B2
(45) Date of Patent: Aug. 14, 2007

(54) DEMODULATOR, OPTICAL DISK DRIVE AND SEMICONDUCTOR INTEGRATED CIRCUIT

(75) Inventor: Toshihiko Kaneshige, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 659 days.

(21) Appl. No.: 10/659,340

(22) Filed: Sep. 11, 2003

(65) Prior Publication Data
US 2004/0109399 A1  Jun. 10, 2004

(30) Foreign Application Priority Data
Sep. 12, 2002 (JP) .............................. 2002-267297

(51) Int. Cl.
*G11B 15/52* (2006.01)
(52) U.S. Cl. ............................... 369/47.19; 369/124.04
(58) Field of Classification Search ...................... None
See application file for complete search history.

(56) References Cited

U.S. PATENT DOCUMENTS 5,717,679 A  2/1998 Mashimo et al.

6,233,654 B1 * 5/2001 Aoki et al. .................. 711/114

FOREIGN PATENT DOCUMENTS

| JP | 4-281647 | 10/1992 |
|---|---|---|
| JP | 07-220409 | 8/1995 |
| JP | 11-016291 | 1/1999 |
| JP | 11-250580 | 9/1999 |
| JP | 2002-074660 | 3/2002 |
| JP | 2002-279645 | 9/2002 |

OTHER PUBLICATIONS

U.S. Appl. 09/953,869, filed Sep. 18, 2001, Kaneshige et al.
U.S. Appl. 10/659,340, filed Sep. 11, 2003, Kaneshige.

* cited by examiner

*Primary Examiner*—Paul W. Huber
(74) *Attorney, Agent, or Firm*—Oblon, Spivak, McClelland, Maier & Neustadt, P.C.

(57) ABSTRACT

A demodulator includes a wobble signal processor configured to convert a waveform of a wobble signal, and to generate a clock and a reference value based on a converted wobble signal. A sampling circuit is configured to sample the converted wobble signal by using the clock, and to generate a sampled signal. A viterbi decoder is configured to decode an auxiliary recording signal superposed on an optical disk by using the reference value and the sampled signal.

20 Claims, 23 Drawing Sheets

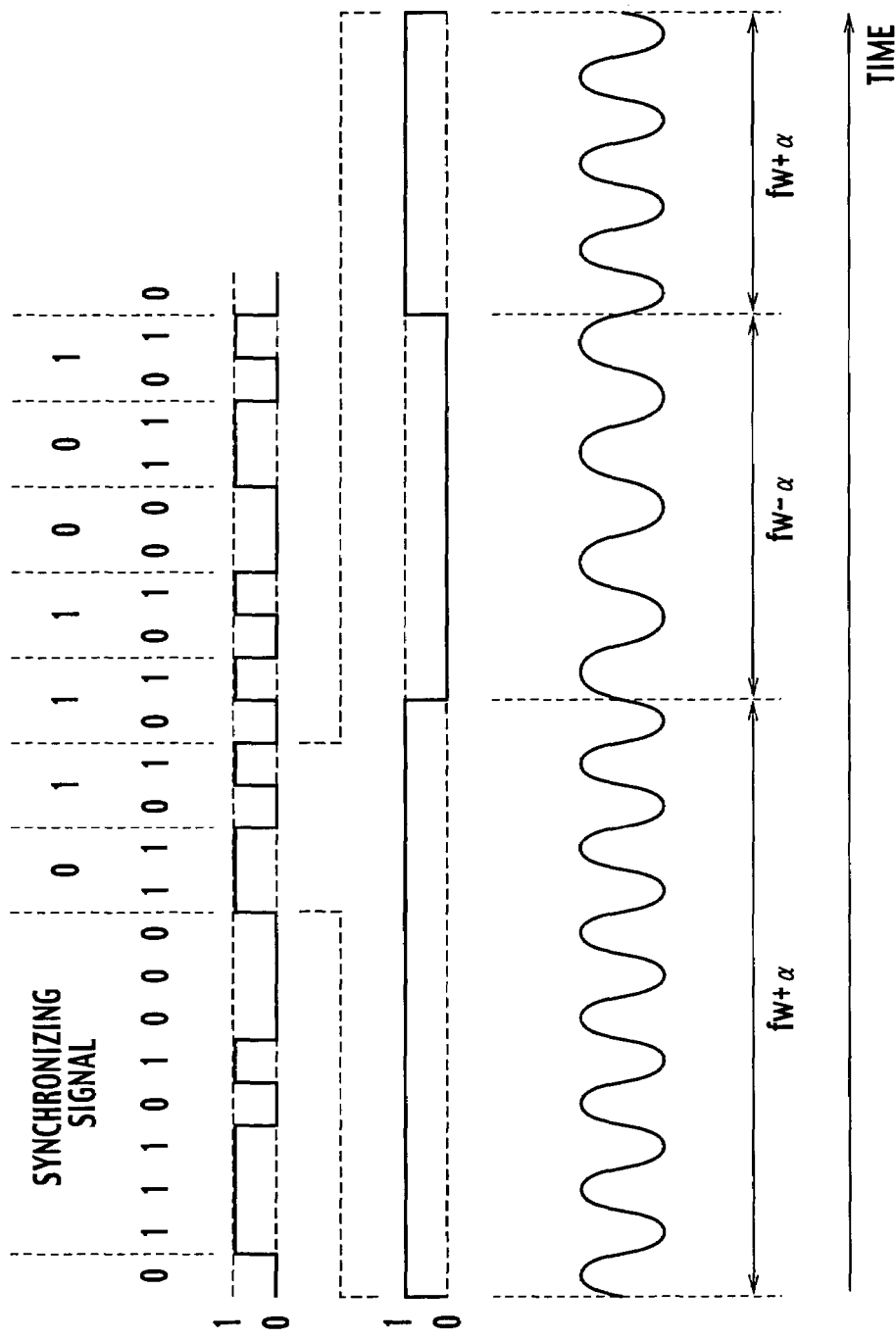

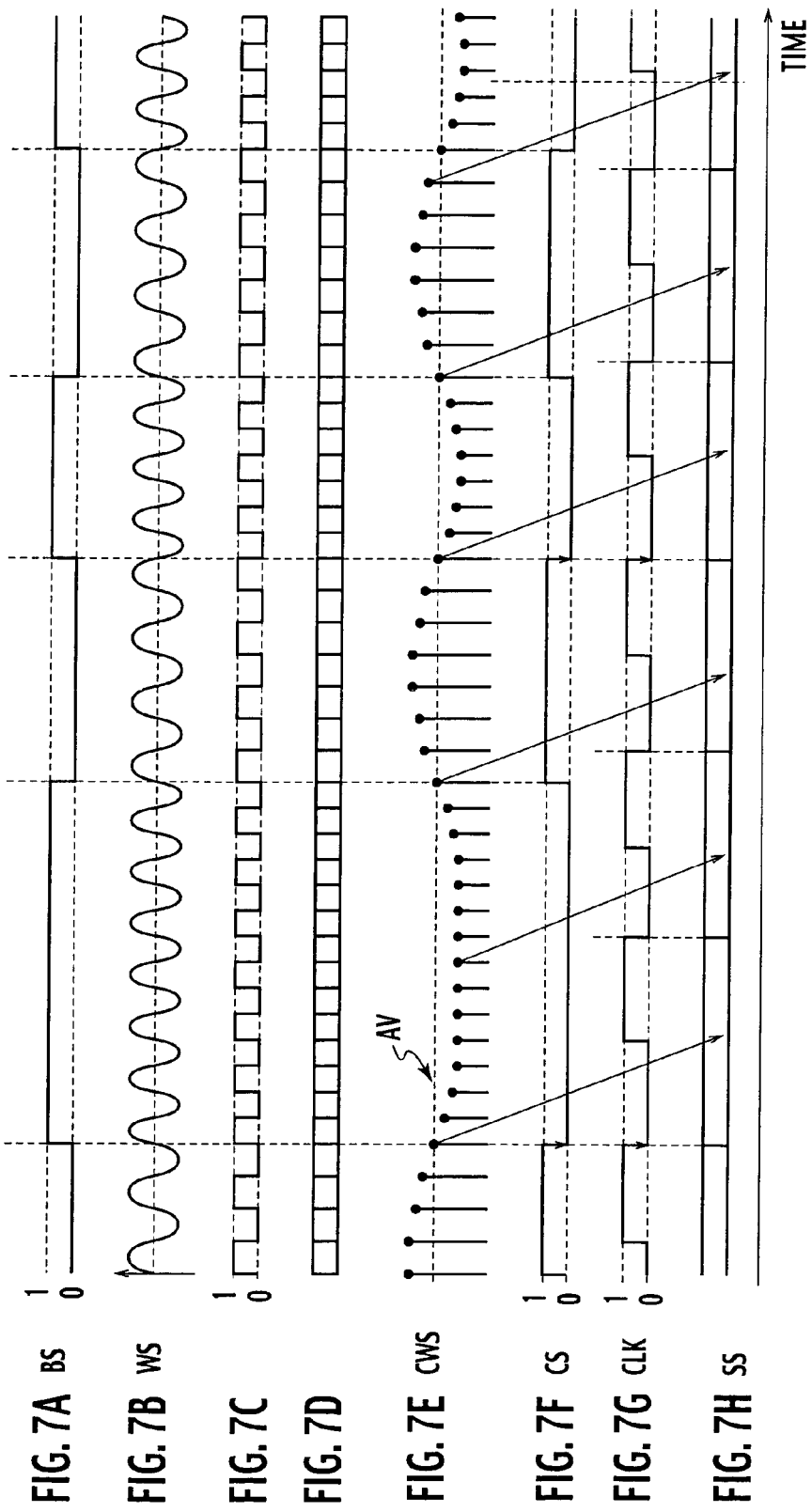

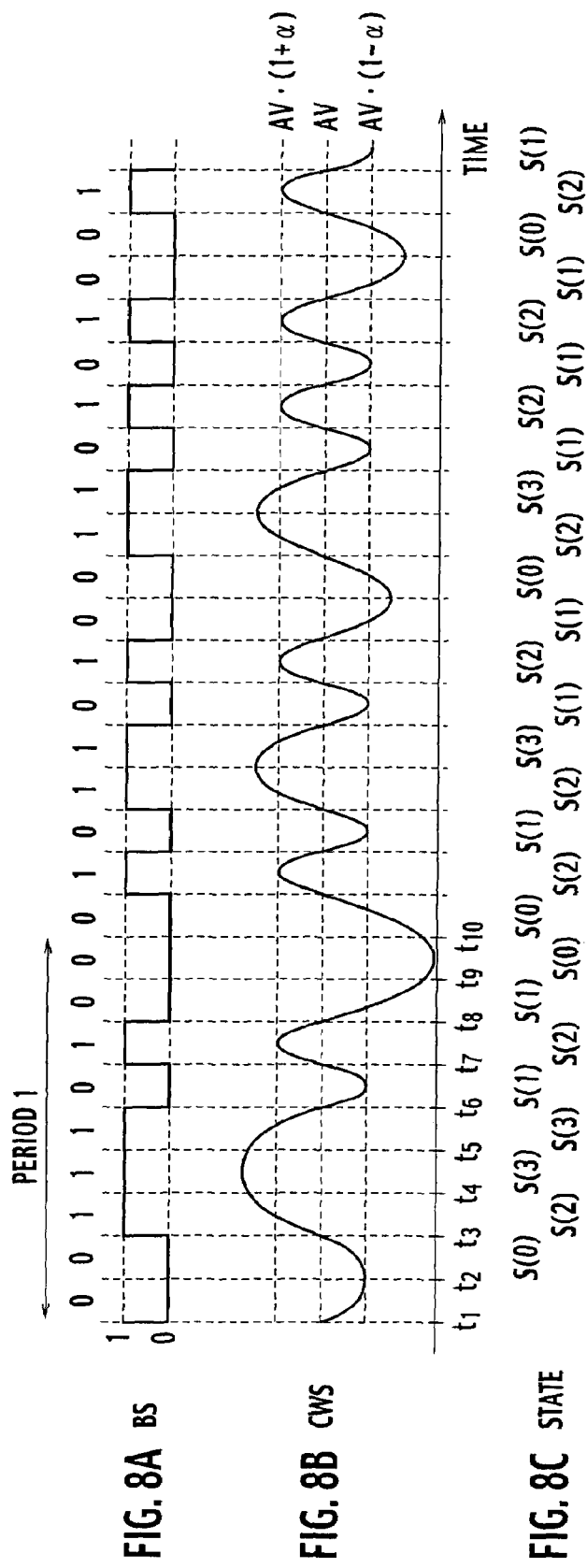

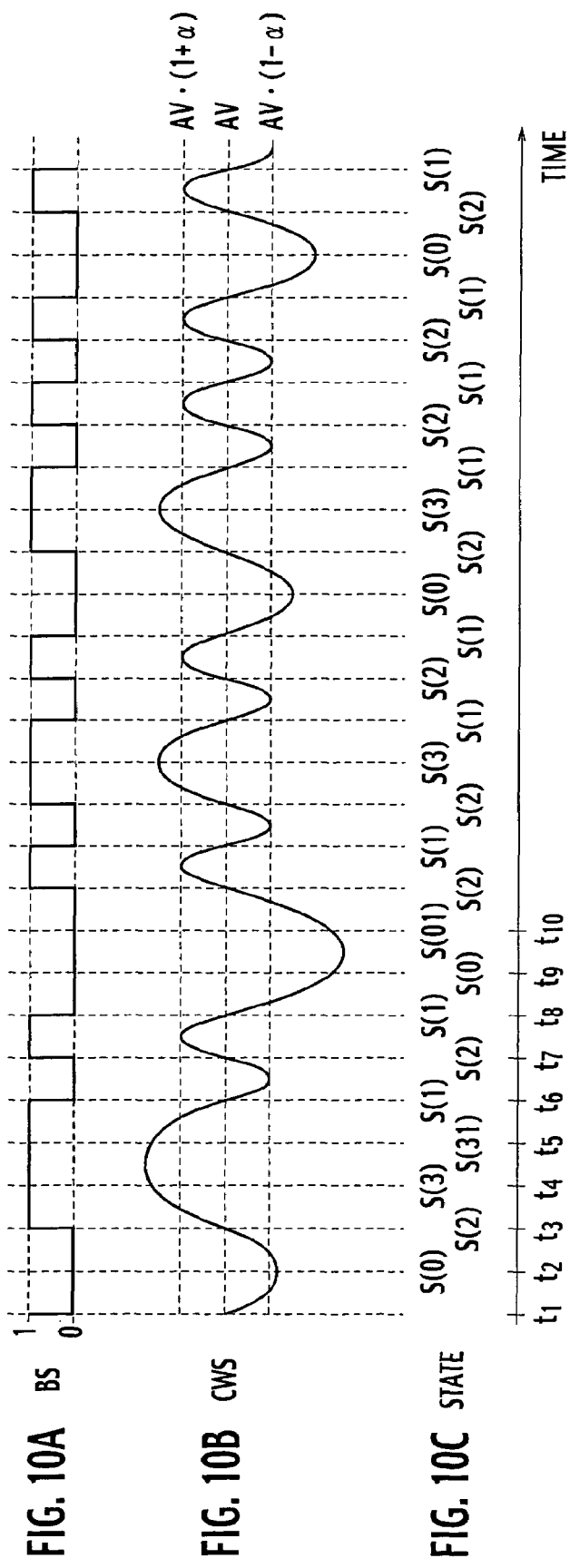

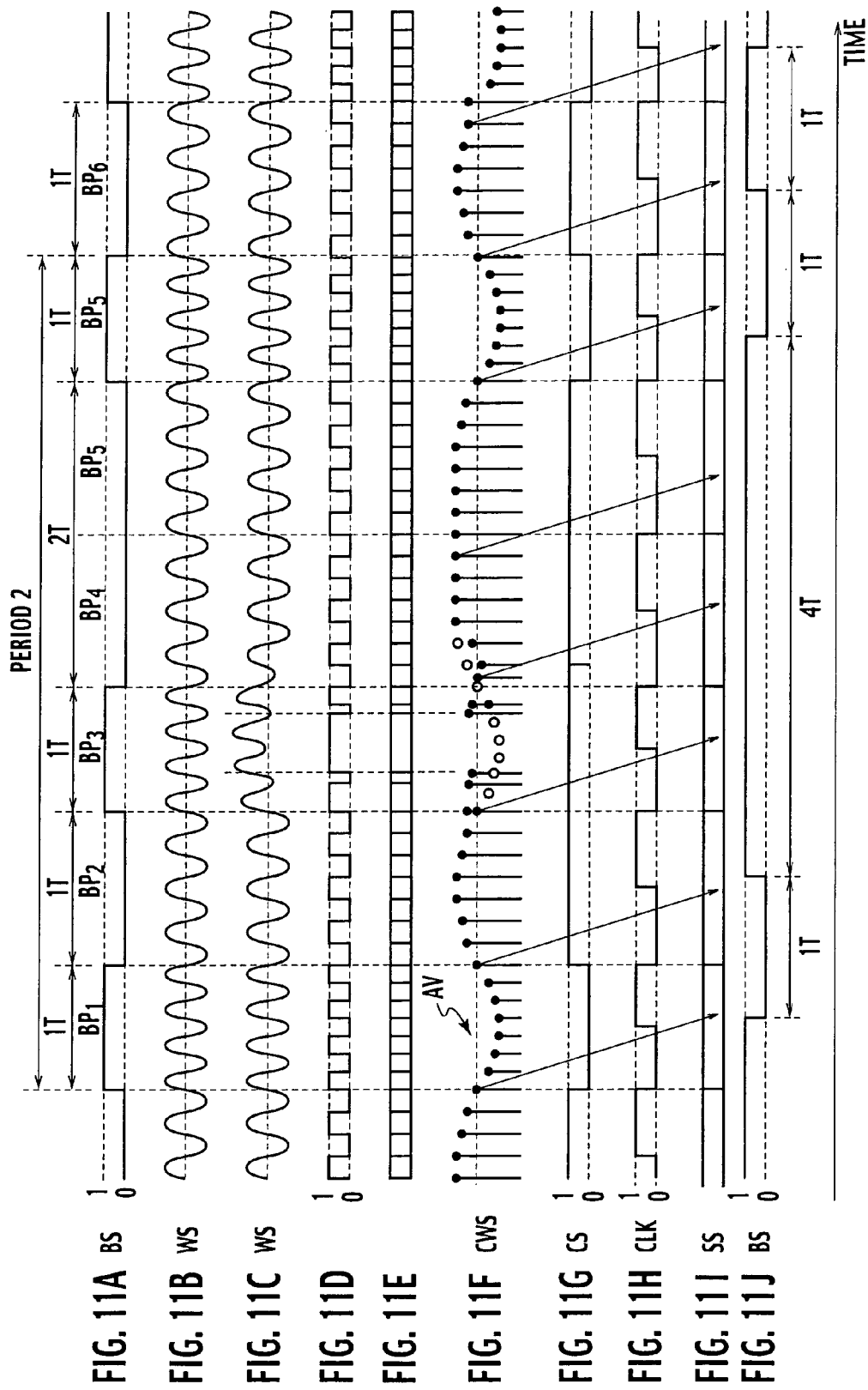

FIG. 12

| (a) PATTERN | (b) BIPHASE CODE SEQUENCE | | | | | | (c) SAMPLED SIGNAL VALUE | | | | | | (d) ROOT-MEAN SQUARE ERROR |
|---|---|---|---|---|---|---|---|---|---|---|---|---|---|
| | BP1 | BP2 | BP3 | BP4 | BP5 | BP6 | L1 | L2 | L3 | L4 | L5 | | |
| 1 | 1 | 0 | 1 | 0 | 0 | 1 | 0 | 0 | 0 | 1 | 0 | | 0.25 |
| 2 | 1 | 0 | 1 | 0 | 1 | 1 | 0 | 0 | 0 | 0 | 1 | | 2.25 |
| 3 | 1 | 0 | 1 | 1 | 0 | 1 | 0 | 0 | -1 | 0 | 0 | | 2.25 |
| 4 | 1 | 0 | 1 | 1 | 1 | 1 | 0 | 0 | -1 | -1 | -1 | | 6.25 |
| 5 | 1 | 0 | 0 | 0 | 0 | 1 | 0 | 1 | 0 | 0 | 0 | | 3.25 |
| 6 | 1 | 0 | 0 | 1 | 1 | 1 | 0 | 1 | 0 | 0 | -1 | | 1.25 |
| 7 | 1 | 0 | 0 | 1 | 1 | 1 | 0 | 1 | 0 | -1 | -1 | | 5.25 |

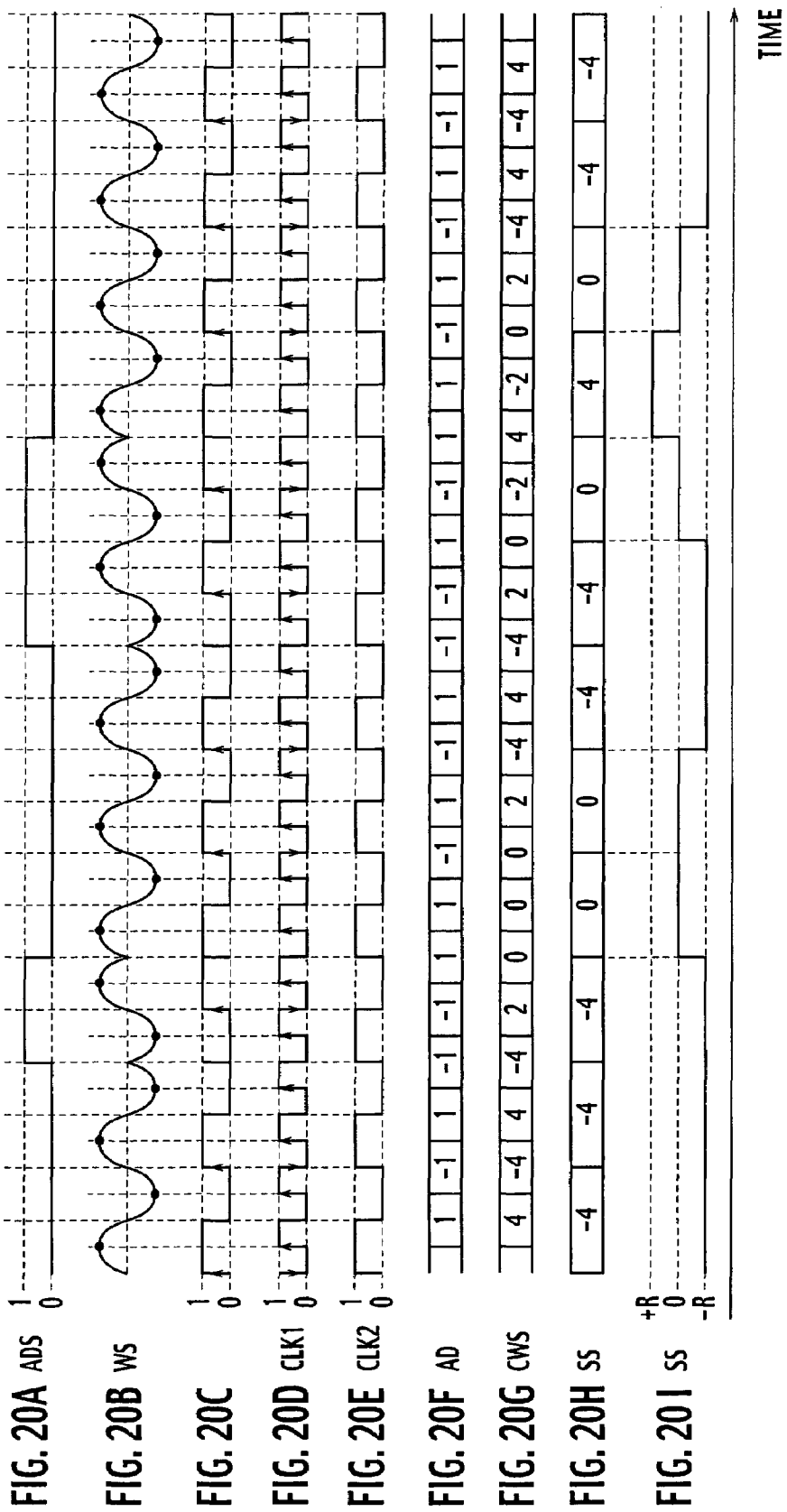

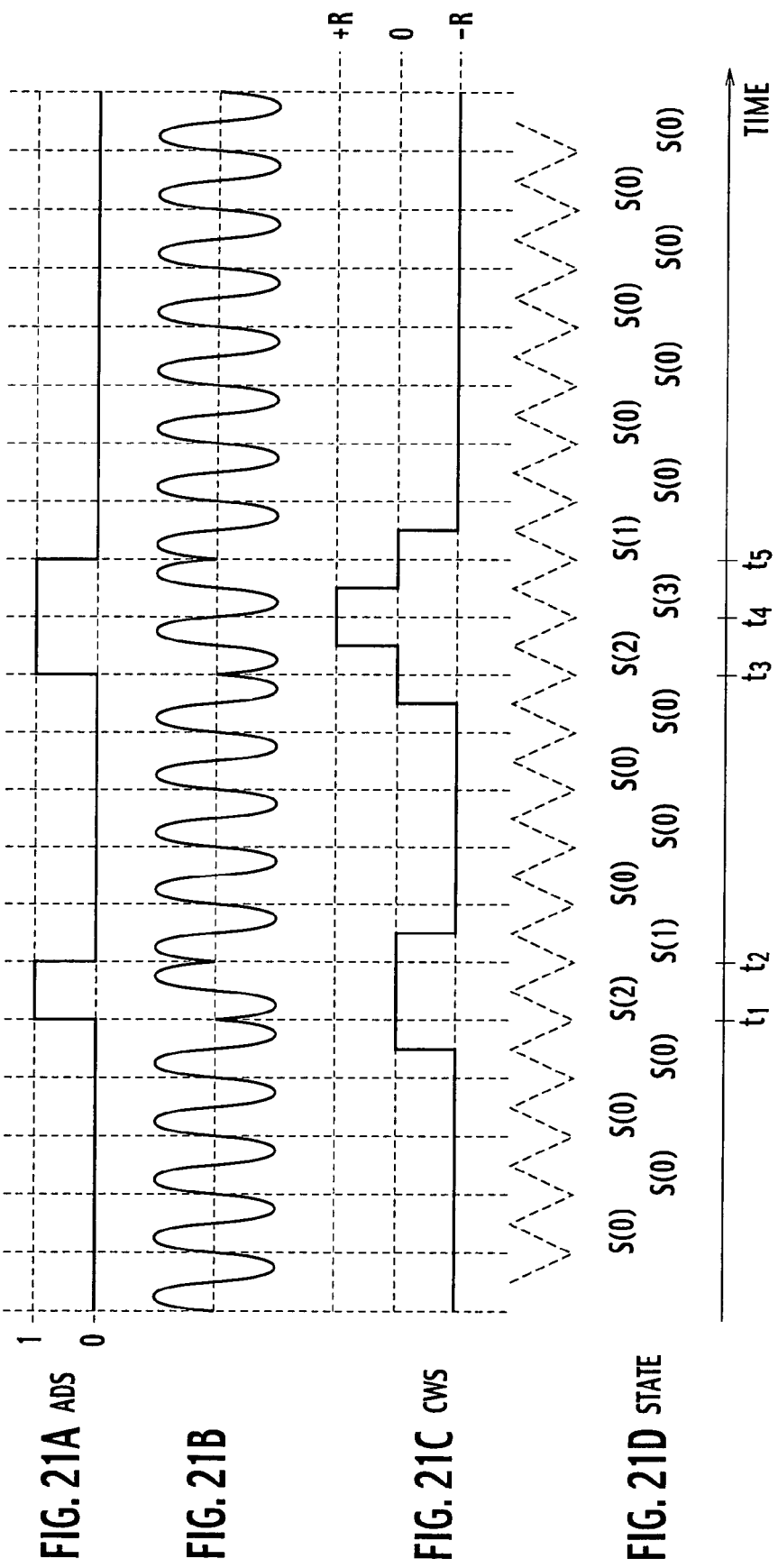

TIME

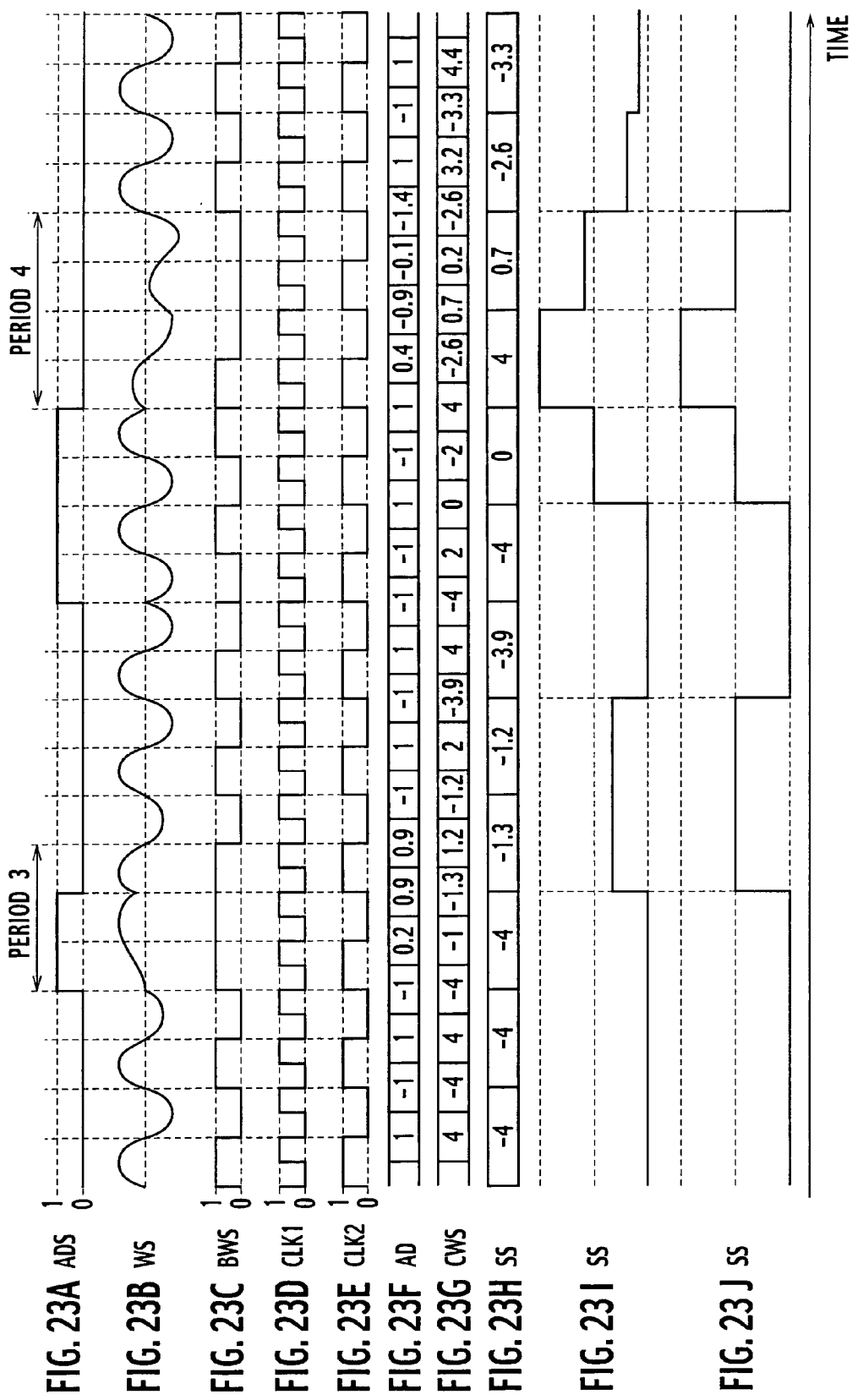

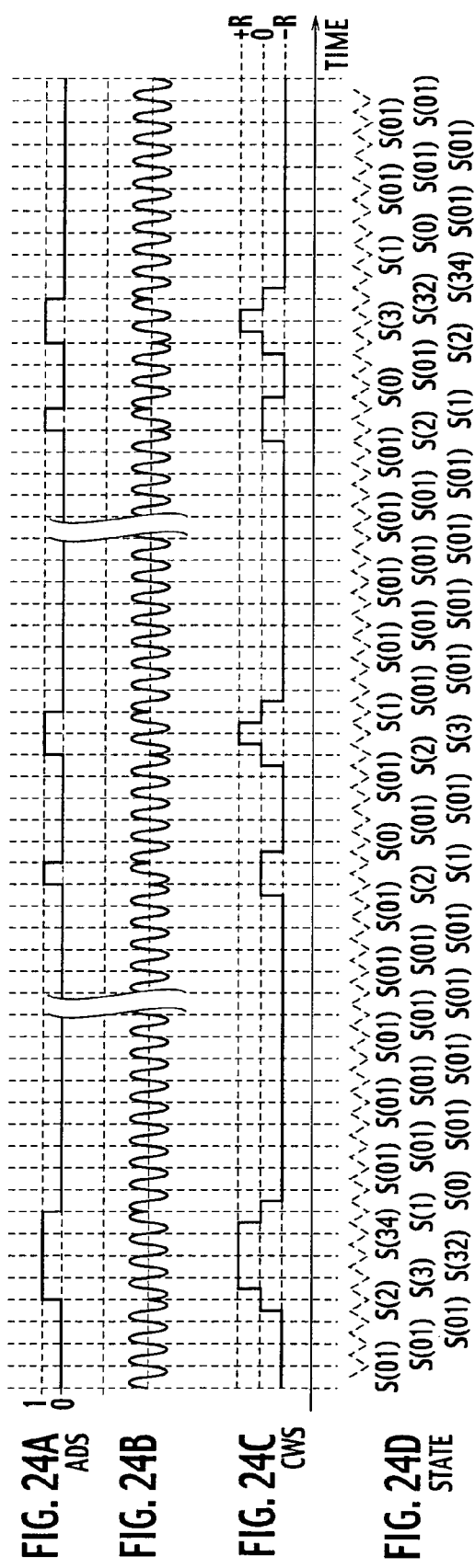

DEMODULATOR, OPTICAL DISK DRIVE AND SEMICONDUCTOR INTEGRATED CIRCUIT

CROSS REFERENCE TO RELATED APPLICATION

This application is based upon and claims the benefit of priority from prior Japanese Patent Application P2002-267297 filed on Sep. 12, 2002; the entire contents of which are incorporated by reference herein.

BACKGROUND OF THE INVENTION

1. Field of the Invention

The present invention relates to an optical disk drive and, more particularly, to a demodulator for demodulating an auxiliary recording signal superposed on an optical disk and a semiconductor integrated circuit monolithically integrating the demodulator on a single semiconductor chip.

2. Description of the Related Art

A compact disk-recordable/rewritable (CD-R/RW) device is available as a recordable optical disk. A guiding groove is preformatted on the CD-R/RW device to guide a pickup. The guiding groove meanders slightly in a radial direction so as to detect a clock for rotation control. Such a track structure is referred to as a "wobbled land groove". Information superposed on a wobbled track of the CD-R/RW device is known as an absolute time in pregroove (ATIP). The absolute time on the CD-R/RW device can be obtained from the ATIP signal. A code sequence of an ATIP signal is converted into a digital frequency modulation signal, i.e., a biphase signal, and further subjected to frequency shift keying (FSK) modulation to be recorded as a wobble track.

A digital versatile disk+recordable/rewritable (DVD+RW) device is also available as a recordable optical disk. As in the case of the CD-R/RW device, a track structure of the DVD+RW device is the wobbled land groove. Information superposed on a wobbled track of the DVD+RW is known as an address in pregroove (ADIP). A code sequence of an ADIP signal is subjected to phase shift keying (PSK) modulation. A physical address on the DVD+RW device is obtained from the ADIP signal to be used for positioning of a recording area or verification of recording position during recording. The ATIP and ADIP signals are very important signals for detecting a state of the optical disk during reproducing and recording.

The ATIP signal is demodulated by an ATIP demodulator from a wobble signal detected from the optical disk by the pickup. Herein, the "wobble signal" is a signal obtained by the calculation of A−B, where A and B denote signals obtained from A and B sections of an optical detector in the pickup. The ATIP demodulator subjects the wobble signal to FSK demodulation, and generates a binarized wobble signal. The binarized wobble signal is latched in synchronization with a clock to demodulate the biphase signal. A biphase demodulator demodulates the ATIP signal from the biphase signal. The ADIP demodulator which demodulates the ADIP signal from the wobble signal first binarizes the wobble signal. The binarized wobble signal is subjected to EX-OR calculation together with a clock. A result of the EX-OR calculation is latched in synchronization with the clock to demodulate the ADIP signal.

During play-back of a recorded disk, since a recording signal is superposed on the wobble signal, a signal to noise (S/N) ratio of the wobble signal is relatively decreased. Furthermore, during recording on the optical disk, a recording light is reflected and superposed on the wobble signal to significantly decrease the S/N ratio of the wobble signal.

The ATIP demodulator cannot perform normal FSK demodulation of a signal portion containing a distorted waveform when the waveform of the wobble signal is distorted by decreasing the S/N ratio. Consequently, a demodulation error occurs in the demodulated ATIP signal. In the ADIP demodulator, when the wobble signal is distorted, a signal portion containing the distorted waveform cannot be subjected to normal binarization. Consequently, the demodulated ADIP signal has a demodulation error. As described above, when the S/N ratio of the wobble signal is significantly decreased, it is difficult for the ATIP demodulator and the ADIP demodulator to carry out accurate demodulation.

SUMMARY OF THE INVENTION

An aspect of the present invention inheres in a demodulator encompassing, a wobble signal processor configured to convert a waveform of a wobble signal, and to generate a clock and a reference value based on a converted wobble signal, a sampling circuit configured to sample the converted wobble signal by using the clock, and to generate a sampled signal, and a viterbi decoder configured to decode an auxiliary recording signal superposed on an optical disk by using the reference value and the sampled signal.

Another aspect of the present invention inheres in a semiconductor integrated circuit encompassing, a wobble signal processor integrated on a semiconductor chip and configured to convert a waveform of a wobble signal, and to generate a clock and a reference value based on a converted wobble signal, a sampling circuit integrated on the semiconductor chip and configured to sample the converted wobble signal by using the clock, and to generate a sampled signal, and a viterbi decoder integrated on the semiconductor chip and configured to decode an auxiliary recording signal superposed on an optical disk by using the reference value and the sampled signal.

Still another aspect of the present invention inheres in an optical disk drive encompassing, a pickup configured to receive light reflected from an optical disk, the reflected light generated by irradiating a laser beam on the optical disk, an RF amplifier configured to amplify a wobble signal generated by the pickup from the received light, a demodulator configured to generate a reference value and a sampled signal based on the wobble signal, and to subject an auxiliary recording signal superposed on the optical disk to viterbi decoding by using the reference value and the sampled signal, a servo controller configured to control an operation of the pickup, a reproducing/recording signal processor configured to carry out signal processing for reproducing or recording with the pickup, and a recording controller configured to control recording of a recording signal from the reproducing/recording signal processor on the optical disk.

BRIEF DESCRIPTION OF THE DRAWINGS

FIGS. 6A to 6E are time charts showing a modulation principle of an ATIP signal according to the first embodiment of the present invention;

FIGS. 7A to 7H are time charts showing an operation of the demodulator according to the first embodiment of the present invention;

FIGS. 8A to 8C are time charts showing operations of the frequency shift circuit and the viterbi decoder according to the first embodiment of the present invention;

FIGS. 10A to 10C are time charts showing operation of a demodulator according to the first modification of the first embodiment of the present invention;

FIGS. 11A to 11J are time charts showing operations of a frequency shift circuit and a viterbi decoder according to the first modification of the first embodiment of the present invention;

FIG. 12 is a table showing a numeric data of demodulator according to the first modification of the first embodiment of the present invention;

FIGS. 20A to 20I are time charts showing an operation of the demodulator according to the second embodiment of the present invention;

FIGS. 21A to 21D are time charts showing operations of the PR filter and the viterbi decoder according to the second embodiment of the present invention;

FIGS. 23A to 23J are time charts showing an operation of the demodulator according to the first modification of the second embodiment of the present invention;

FIGS. 24A to 24D are time charts showing operations of the PR filter and the viterbi decoder according to the first modification of the second embodiment of the present invention.

DETAILED DESCRIPTION OF EMBODIMENTS

Figure 1:
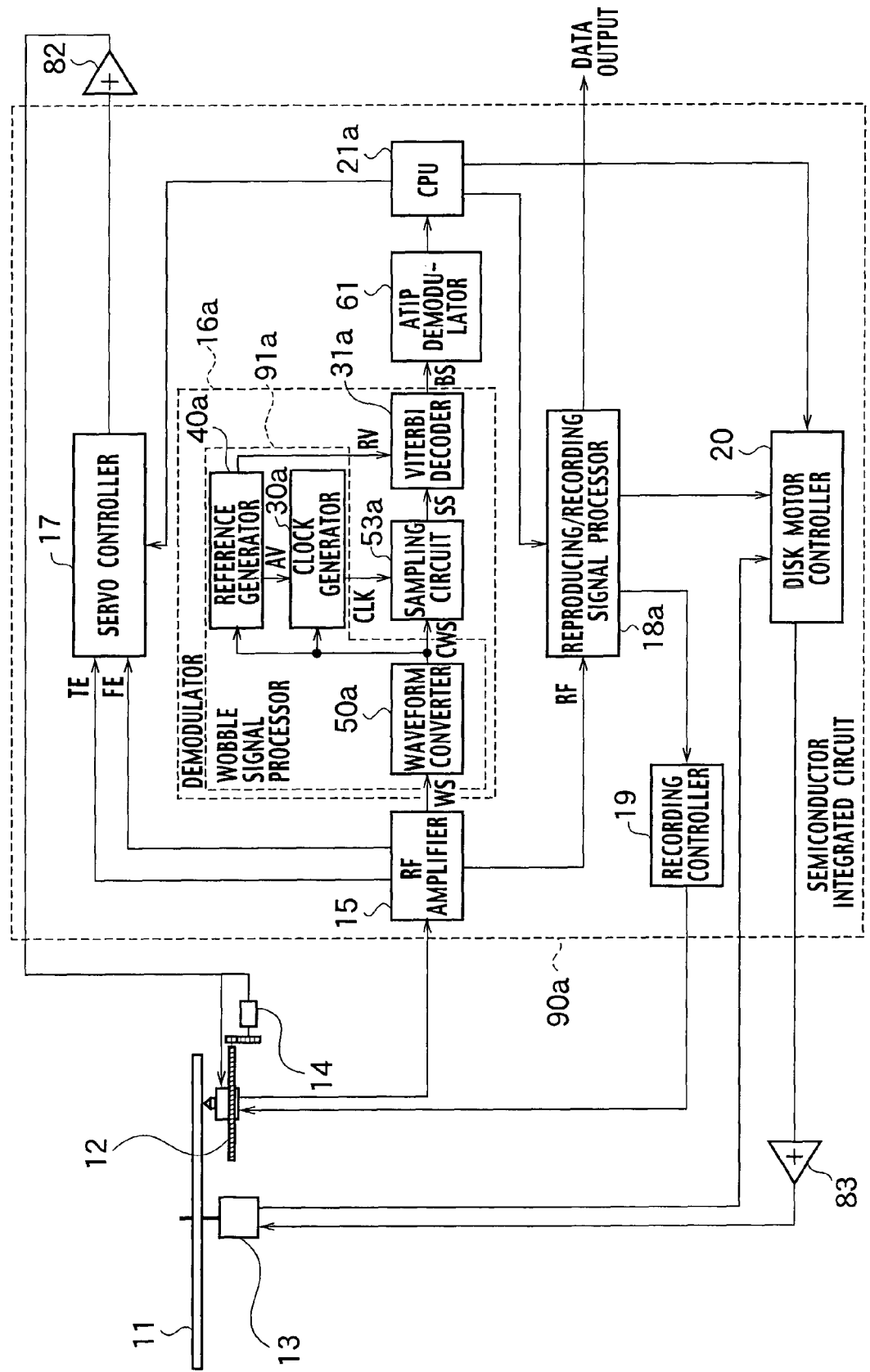
FIG. 1 is a block diagram showing an optical disk drive according to a first embodiment of the present invention.

Various embodiments of the present invention will be described with reference to the accompanying drawings. It is to be noted that the same or similar reference numerals are applied to the same or similar parts and elements throughout the drawings, and description of the same or similar parts and elements will be omitted or simplified. In the following descriptions, numerous specific details are set forth such as specific signal values, etc. to provide a thorough understanding of the present invention. However, it will be obvious to those skilled in the art that the present invention may be practiced without such specific details. In other instances, well-known circuits have been shown in block diagram form in order not to obscure the present invention with unnecessary detail. In the following description, the words "connect" or "connected" defines a state in which first and second elements are electrically connected to each other without regard to whether or not there is a physical connection between the elements.

(First Embodiment)

As shown in FIG. 1, an optical disk drive according to a first embodiment of the present invention includes a pickup 12 configured to receive light reflected from a optical disk 11, the reflected light generated by irradiating a laser beam on the optical disk 11, a radio-frequency (RF) amplifier 15 configured to amplify a wobble signal WS generated by the pickup 12 from the received light, a demodulator 16a configured to generate a reference value RV and a sampled signal SS based on the wobble signal WS, and to subject an auxiliary recording signal recorded in the optical disk 11 to viterbi decoding by using the reference value RV and the sampled signal SS, a servo controller 17 configured to control an operation of the pickup 12, a reproducing/recording signal processor 18a configured to carry out signal processing necessary for reproducing or recording with the pickup 12, and a recording controller 19 configured to control recording of a recording signal from the reproducing/recording signal processor 18a on the optical disk 11. Herein, the "auxiliary recording signal" refers to a signal recorded for a wobbled track 10 of the optical disk 11 shown in FIG. 2, and used to assist reproducing and recording of a signal reproducing a physical address, absolute time and the like, on the optical disk 11, or signal equivalent to the above.

Figure 2:
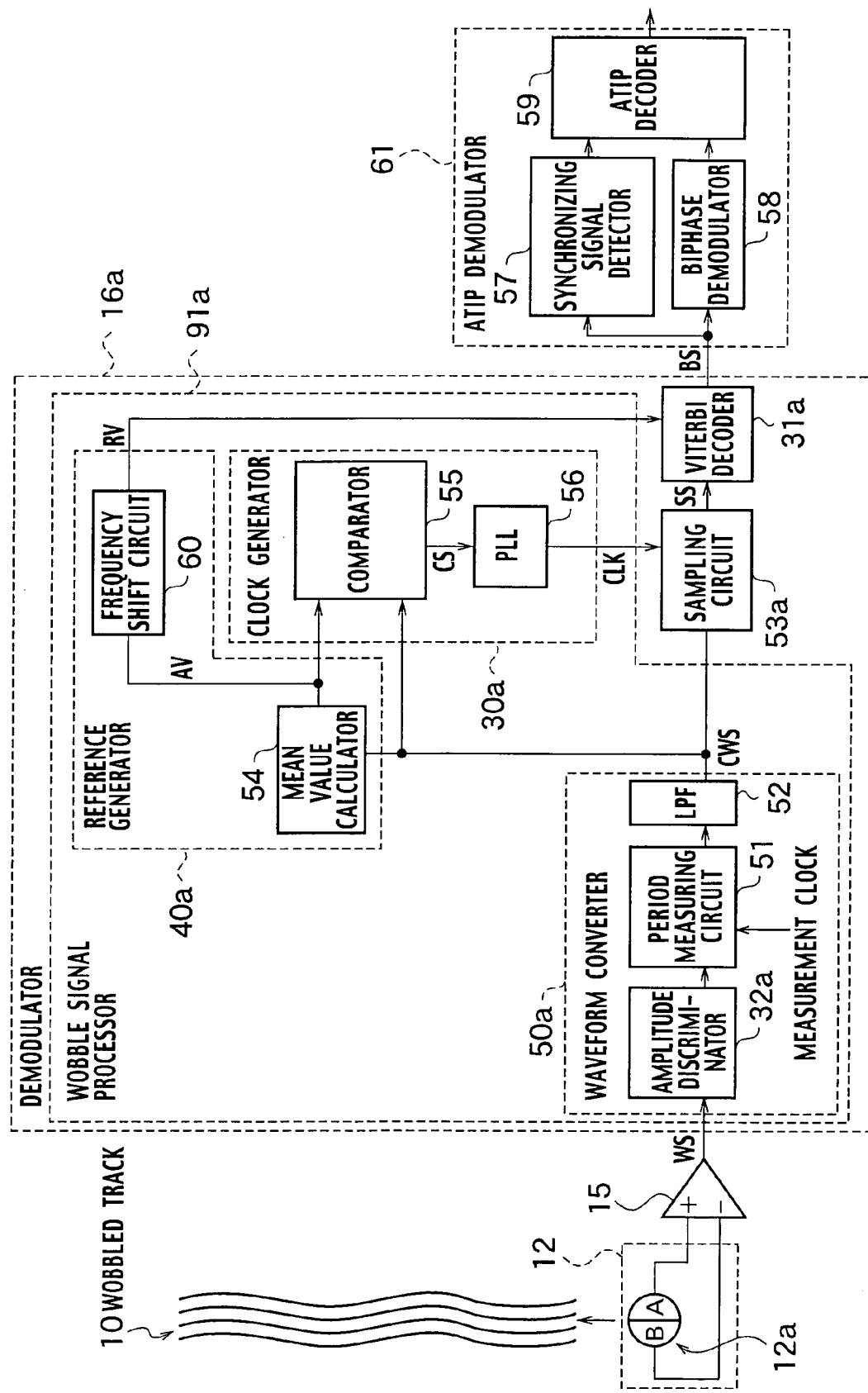
FIG. 2 is a block diagram showing a demodulator according to the first embodiment of the present invention.

Furthermore, the optical disk drive according to the first embodiment has a disk motor 13 configured to drive the optical disk 11, and disk motor controller 20 configured to control rotation of the disk motor 13 through a disk motor driver 83. The RF amplifier 15 generates a tracking error signal TE, a focus error signal FE, and an information signal RF. The demodulator 16a, according to the first embodiment, demodulates a biphase signal BS as the auxiliary recording signal. As shown in FIG. 2, the pickup 12 shown in FIG. 1 includes an optical detector 12a.

As shown in FIG. 1, the demodulator 16a includes a wobble signal processor 91a configured to convert a waveform of the wobble signal WS, and to generate a clock CLK and the reference value RV based on a converted wobble signal CWS, a sampling circuit 53a configured to sample the converted wobble signal CWS by using the clock CLK, and to generate the sampled signal SS, and a viterbi decoder 31a configured to decode the auxiliary recording signal recorded on the optical disk 11 by using the reference value RV and the sampled signal SS. A flip-flop (F/F), for example, can be used for the sampling circuit 53a. The demodulator 16a is connected to a central processing unit (CPU) 21a through a ATIP demodulator 61. The CPU 21a calculates time information on the optical disk 11. Furthermore, the CPU 21a controls operations of the servo controller 17, reproducing/recording signal processor 18a, and disk motor controller 20 based on the time information.

As shown in FIG. 1, the wobble signal processor 91a includes a waveform converter 50a configured to measure a cycle of the wobble signal WS, and to generate the converted wobble signal CWS, a reference generator 40a configured to calculate the mean value AV of an amplitude of the converted wobble signal CWS, and to generate a first, second, and third reference values based on the mean value AV, and a clock generator 30a configured to generate a clock CLK based on the converted wobble signal CWS and the mean value AV.

As shown in FIG. 2, the waveform converter 50a includes an amplitude discriminator 32a configured to binarize the wobble signal WS, a period measuring circuit 51 connected to the amplitude discriminator 32a and configured to measure periods between edges of a binarized wobble signal based on a measurement clock, and a low-pass filter (LPF) 52 connected to the period measuring circuit 51. For example, a digital filter is available for the LPF 52. A frequency of the measurement clock is larger by approximately 256 times or more than a wobble signal frequency. Thus, in the case of CD 1× speed, a frequency of the measurement clock will be about 5.6 MHz, since the wobble signal frequency is about 22 kHz. When the disk rotational speed is increased, the frequency of the measurement clock must be increased in proportion thereto. The period measuring circuit 51 includes an oscillator having a variable or changeable frequency such as a programmable crystal oscillator. Alternatively, the period measuring circuit 51 includes an oscillator configured to oscillate at a constant frequency, and a divider having a changeable or variable dividing ratio configured to divide the frequency provided by the oscillator. The LPF 52 is set to a cutoff frequency to enable pass through of a frequency band of the biphase signal. A frequency of the biphase signal is as large as about 7 times that of the wobble frequency. Accordingly, the cutoff frequency of the LPF 52 is set to, for example, about 22 kHz×7=160 kHz at the CD 1×speed.

Figure 3:
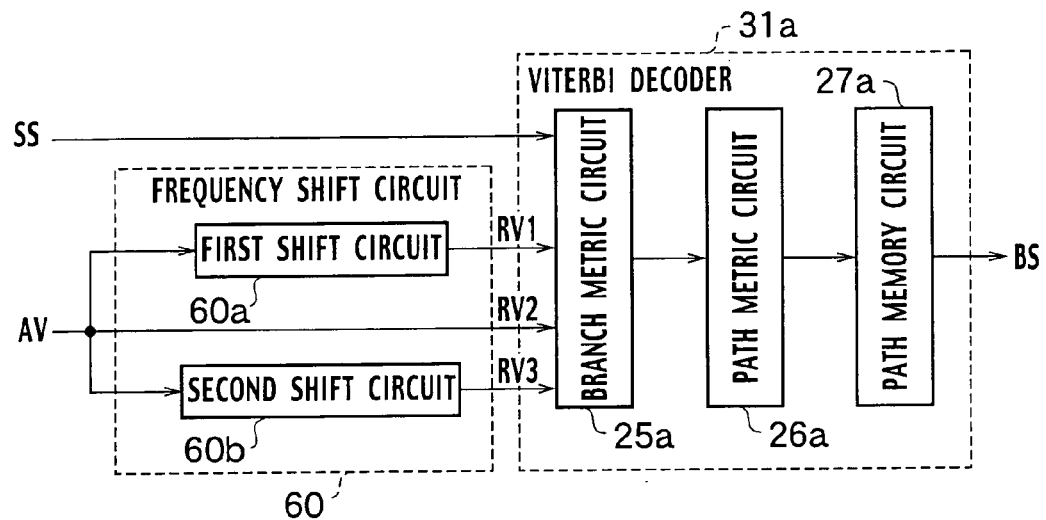
FIG. 3 is a block diagram showing a frequency shift circuit and a viterbi decoder according to the first embodiment of the present invention.

As shown in FIG. 2, the reference generator 40a includes a mean value calculator 54 connected to the LPF 52, and a frequency shift circuit 60 connected to the mean value calculator 54. The mean value calculator 54 calculates the mean value AV of output amplitude of the LPF 52. The frequency shift circuit 60 generates a first, second, and third reference values based on the mean value AS. As shown in FIG. 3, the frequency shift circuit 60 includes a first shift circuit 60a configured to calculate the first reference value RV1 based on the mean value AV, and a second shift circuit 60b configured to calculate the third reference value RV3 based on the mean value AV. Additionally, the frequency shift circuit 60 directly transmits the mean value AV to the viterbi decoder 31a as a second reference value RV2. As shown in FIG. 2, the clock generator 55 includes a comparator 55 having an input connected to the LPF 52, and another input connected to the mean value calculator 54, and a phase locked loop (PLL) 56 connected between the comparator 55 and the sampling circuit 53a. For example, a digital comparator is available as the comparator 55. The comparator 55 compares the converted wobble signal CWS with the mean value AV, and generates a comparison signal CS. The PLL 56 multiplies the comparison signal CS, and generates the clock CLK.

As shown in FIG. 2, the ATIP demodulator 61 includes a synchronizing signal detector 57 connected to the viterbi decoder 58, a biphase demodulator 58 connected to the viterbi decoder 58, and an ATIP decoder 59 connected to the synchronizing signal detector 57 and the biphase demodulator 58. The synchronizing signal detector 57 detects a synchronizing signal from the biphase signal BS. The biphase demodulator 58 demodulates an ATIP signal from the biphase signal BS. The ATIP decoder 59 converts the ATIP signal into data which the CPU 21a can decode.

As shown in FIG. 3, the viterbi decoder 31a includes a branch metric circuit 25a configured to generate first, second, and third squared errors SE1, SE2, and SE3 based on the first, second, and third reference values RV1, RV2, and RV3, a path metric circuit 26a configured to calculate a survivor path based on the first, second, and third squared errors SE1, SE2, and SE3, and a path memory circuit 27a configured to store a code sequence in accordance with the survivor path, and to merge the code sequence as the biphase signal BS.

Figure 4:
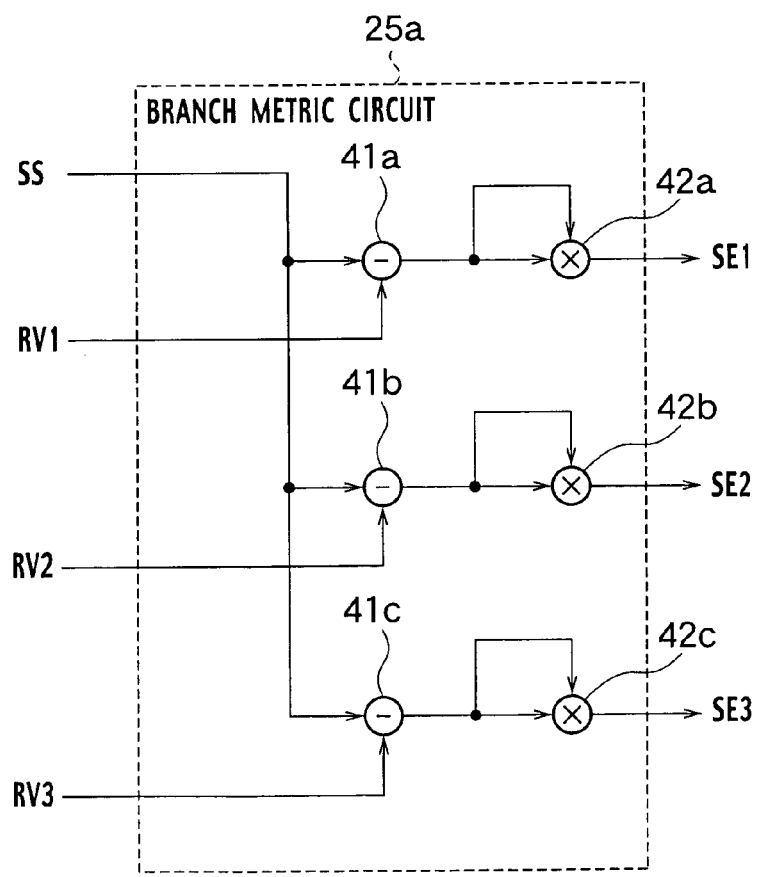
FIG. 4 is a block diagram showing a branch metric circuit according to the first embodiment of the present invention.

As shown in FIG. 4, the branch metric circuit 25a includes first, second, and third subtracters 41a, 41b, and 41c configured to calculate errors between the sampled signal SS and the first, second, and third reference value RV1, RV2, and RV3 respectively, and to generate first, second, and third error signals, and first, second, and third multipliers 42a, 42b, and 42c configured to square the first, second, and third error signals respectively. The path metric circuit 26a shown in FIG. 3 mainly comprises a plurality of adders. The path memory circuit mainly comprises a plurality of selectors and registers.

Figure 5A:
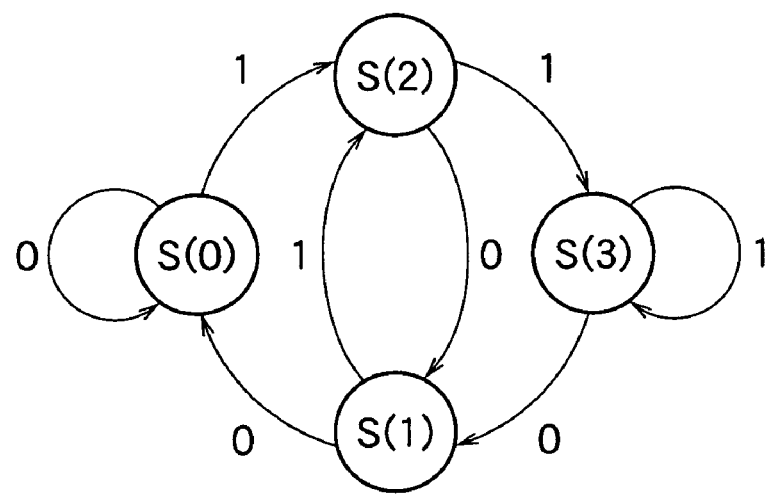
FIG. 5A is a state transition diagram showing an operation of the viterbi decoder according to the first embodiment of the present invention.

The viterbi decoder 31a carries out viterbi decoding based on a state transition diagram shown in FIG. 5A. In the state transition diagram shown in FIG. 5A, a biphase code sequence is correlated to states S(0) to S(3) as shown in Table 1:

TABLE 1

| Biphase code sequence | State | Reference value |
| --- | --- | --- |
| 00 | S(0) | AV(1 − α) |
| 10 | S(1) | AV |
| 01 | S(2) | AV |
| 11 | S(3) | AV(1 + α) |

Figure 5B:
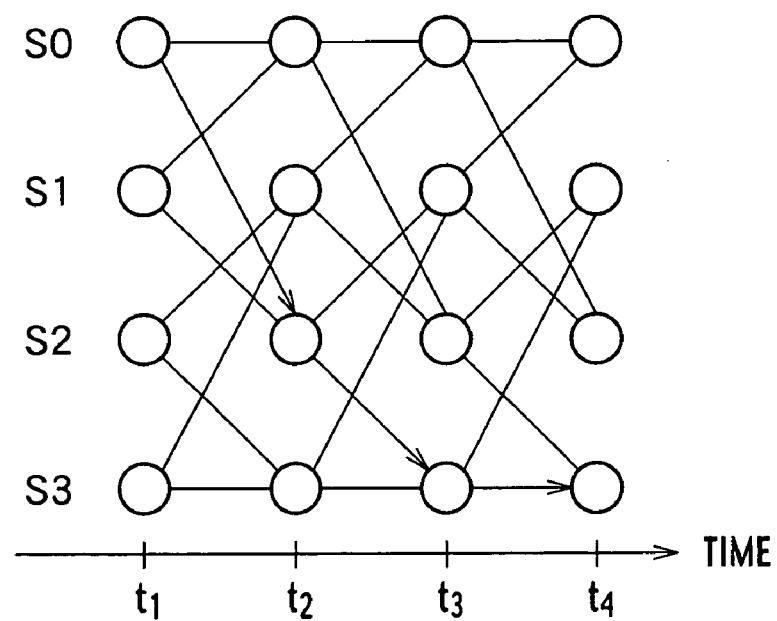
FIG. 5B is a trellis diagram in accordance with the state diagram shown in FIG. 5A.

A trellis diagram shown in FIG. 5B is obtained from the state transition diagram of FIG. 5A. The path metric circuit 26a and the path memory circuit 27a are identified with the state transition diagram shown in FIG. 5A and the trellis diagram shown in FIG. 5B.

The information signal RF supplied by the RF amplifier 15 is transmitted to the reproducing/recording signal processor 18a. In reproducing data, the reproducing/recording signal processor 18a extracts a data signal from the information signal RF, and converts the data signal into a binary value. Furthermore, the reproducing/recording signal processor 18a generates a bit clock and a reproducing synchronizing signal based on the binary value, and carries out demodulation and error correction. In recording data, the reproducing/recording signal processor 18a adds ID data and parity bits, etc. to the data, and carries out error corrective coding and modulation. The modulated data is supplied to the recording controller 19 in synchronization with the bit clock. The recording controller 19 converts the modulated data into laser drive pulses that can form pit patterns in optical disk 11, and drives the laser of the pickup 12. On the other hand, the servo controller 17 drives an actuator 14 though an actuator driver 82 based on the tracking error signal TE and the focus error signal FE.

When a method for controlling a rotation of the optical disk 11 is constant angular velocity (CAV) control, the frequency generator (FG) signal from the disk motor 13 is supplied to the disk motor controller 20 shown in FIG. 1. As a result, through the disk motor driver 83, rotational speed of the disk motor 13 is controlled to have a CAV rotational speed. In the case of constant liner velocity (CLV) control, relative speed between the optical disk 11 and the laser beam is controlled to have a CLV rotational speed.

The RF amplifier 15, the demodulator 16a, the ATIP demodulator 61, reproducing/recording signal processor 18a, the recording controller 19, the disk motor controller 20, and the CPU 21a can be monolithically integrated so as to form a semiconductor integrated circuit 90a on a single semiconductor chip (not illustrated). Since the semiconductor integrated circuit 90a is formed as a system large-scale integrated circuit (LSI), wirings connecting respective circuits to the CPU 21a serve as a bus line.

The ATIP signal superposed on the optical disk 11 is a code sequence exemplified in FIG. 6A. The synchronizing signals are inserted at a predetermined cycle. The ATIP signal is converted into the biphase signal BS exemplified in FIG. 6B. The synchronizing signal is converted into binary signals "11101000" or "00010111". As shown in FIG. 6E, a signal obtained by subjecting the biphase signal to a binary FSK modulation is recorded on the optical disk 11. One bit of the biphase signal BS constitutes 3.5 cycles of the binary FSK modulated signal. As shown in FIG. 6B, logic value "0" is converted into "11" or "00", and "1" is converted into "01" or "10". The bit sequence shown in FIG. 6B will be a waveform shown in FIG. 6C, and a partially expanded waveform is exemplified in FIG. 6D. As shown in FIG. 6E, the binary FSK modulated signal will be "fω+α" when the biphase signal BS is at a high level, and "fω−α" at a low level. Herein, "fω" denotes an average frequency of the binary FSK modulated signal, and "α" denotes a predetermined amount of frequency shift. The average frequency "fω" of the binary FSK modulated signal is constant and, generally, a modulation of approximately +5% is executed for "1", and a modulation of approximately −5% is executed for logic value "0".

Next, an operation of the demodulator 16a according to the first embodiment will be described by using FIGS. 1 to 8C.

(A) It is assumed that a biphase signal BS exemplified in FIG. 7A is subjected to FSK modulation to be superposed on a wobble track of the optical disk 11 as shown in FIG. 7B. The biphase signal BS shown in FIG. 7A shows a part of a biphase signal shown in FIG. 8A. The RF amplifier 15 generates the wobble signal WS shown in FIG. 7B. The biphase signal BS is obtained by the calculation of A−B, where A and B each denote signals obtained from A and B sections of the optical detector 12a shown in FIG. 2. The wobble signal WS shown in FIG. 7B will be a signal similar to a representation of the meandering of the wobble track. The wobble signal WS supplied from the RF amplifier 15 is transmitted to the amplitude discriminator 32a shown in FIG. 2.

(B) The amplitude discriminator 32a binarizes the wobble signal WS by using an average level of the wobble signal WS as a slice level. The binarized wobble signal shown in FIG. 7C is supplied to the period measuring circuit 51. As shown in FIG. 7D, the period measuring circuit 51 generates period measurement data on each edge generation of the binarized wobble signal. As shown in FIG. 7E, the period measurement data supplied by the period measuring circuit 51 is subjected to smoothing by the LPF 52.

(C) The mean value calculator 54 calculates the mean value AV of output amplitude of the LPF 52 as indicated by a broken line in FIG. 7E. A value indicated by AV in FIG. 8B will be the mean value AV. Observed in an analog manner, the output of the LPF 52 will be a waveform similar to that shown in FIG. 8B. The waveform of FIG. 8B has amplitude which reflects a code sequence of the biphase signal BS shown in FIG. 8A. As shown in FIG. 3, the mean value AV supplied from the mean value calculator 54 is transmitted to the first shift circuit 60a and second shift circuit 60b of the frequency shift circuit 60. The first shift circuit 60a multiplies the mean value AV by (1−α) to be generated as the first reference value RV1. The second shift circuit 60b multiplies the mean value AV by (1+α) to be generated as a third reference value RV3. It should be noted that, according to established standard of the CD-R/RW, an amount of frequency shift "α" is ±1 kHz with respect to a wobble average frequency of 22.5 kHz. Thus, to match the established standard, α=1/22.5=0.04 is set as an amount of frequency shift. As shown in FIG. 4, the first, second, and third reference values RV1, RV2, and RV3 are supplied to the branch metric circuit 25a of the viterbi decoder 31.

(D) The comparator 55 compares the value of the converted wobble signal CWS supplied from the LPF 52 with the mean value AV. As shown in FIG. 7F, when the converted wobble signal CWS is equal to or larger than the mean value AV, the comparator 55 generates a high-level signal as the comparison signal CS. On the other hand, when the converted wobble signal CWS is smaller than the mean value AV, the comparator 55 generates a low-level signal as the comparison signal CS. As shown in FIG. 7G, the PLL 56 generates the clock CLK having a frequency that coincides with the frequency of a carrier component of the comparison signal CS. As shown in FIGS. 7F and 7G, the trailing edge of the comparison signal CS and the trailing edge of the clock CLK are synchronized in phase with each other.

(E) As shown in FIG. 7H, the sampling circuit 53a samples the converted wobble signal CWS in synchronization with the trailing edge of the clock CLK generated by the PLL 56. The sampled signal SS supplied from the sampling circuit 53a is transmitted to the branch metric circuit 25a of the viterbi decoder 31a.

(F) The first subtracter 41a shown in FIG. 4 determines any error between the sampled signal SS and the first reference value RV1 and supplies the error to the first multiplier 42a as the first error signal. The second subtracter 41b determines any error between the sampled signal SS and the second reference value RV2 and supplies the error to the second multiplier 42b as the second error signal. The third subtracter 41c determines any error between the sampled signal SS and the third reference value RV3 and supplies the error to the third multiplier 42C as the third error signal. The first multiplier 42a squares the first error signal, and supplies a first square error SE1 to the path metric circuit 26a. The second multiplier 42b squares the second error signal, and supplies a second square error SE2 to the path metric circuit 26a. The third multiplier 42b squares the third error signal, and supplies a third square error SE3 to the path metric circuit 26a.

(G) The path metric circuit 26a compares the first, second, and third square errors SE1, SE2, and SE3 with one another to determine the smallest of the first, second, and third square errors SE1, SE2, and SE3. Herein, in a "period 1" shown in FIG. 8A, a code sequence of the biphase signal BS is "001110100". The sampled signal SS obtained by the waveform converted signal CWS shown in FIG. 8B is closer to the second reference value RV2 at time t1, and the second square error SE2 will be smallest. The sampled signal SS is closer to the first reference value RV1 at time t2, and the first square error SE1 will be smallest. The sampled signal SS is closer to the first reference value RV1 at time t2, and the first square error SE1 will be smallest. The sampled signal SS is closer to the second reference value RV2 at time t3, and the second square error SE2 will be smallest. The sampled signal SS is closer to the third reference value RV3 at time t4, and the third square error SE3 will be smallest. The sampled signal SS is closer to the third reference value RV3 at time t5, and the third square error SE3 will be smallest. Similarly, the second square error SE2 is smallest at time t6. The second square error SE2 is smallest at time t7. The second square error SE2 is smallest at time t8. The first square error SE1 is smallest at time t9. The first square error SE1 is smallest at time t10. As a result, the sampled signal SS at each time in the "period 1" corresponds to the first, second, and third reference values RV1, RV2, and RV3 such as t1: AV, t2: AV(1−α), t3: AV, t4: AV(1+α), t5: AV(1t7: AV, t8: AV, t9: AV(1−α), and t10: AV(1−α). When the sampled signal SS corresponds to the "state" shown in Table 1, the sampled signal SS transfers at the order of S(0), S(2), S(3), S(3), S(1), S(2), S(1), S(0), and S(0). Therefore, the "state" transfers in accordance with the arrows shown in FIG. 5B.

(H) Referring to the correspondence in Table 1, a select signal having correlations with t1:"00", t2:"01", t3:"11", t4:"11", t5:"11", t6:"00", t8:"00", t9:"00", and t10:"00" and previous data is supplied to the path memory circuit 27a. The path memory circuit 27a stores a code sequence corresponding to the select signal supplied from the path metric circuit 26a, and sequentially generates merged codes as the biphase signal BS. As a result, the path memory circuit 27a generates the sequence "001110100".

As described above, according to the first embodiment, by subjecting the wobble signal WS to viterbi decoding by the viterbi decoder 31a, it is possible to demodulate the auxiliary recording signal superposed on the optical disk 11 with a low error rate. Even during reproducing or recording data on a recorded optical disk, the optical disk drive according to the first embodiment stably reproduces or records the data. Furthermore, the reference generator 40a generates the first, second, and third reference values RV1, RV2, and RV3 as reference values to be supplied to the viterbi decoder 31a. The viterbi decoder 31a carries out the viterbi decoding based on the sampled signal SS and the first, second, and third reference values RV1, RV2, and RV. Thus, even if the S/N ratio is decreased, and then the wobble signal WS is distorted, the viterbi decoding can be accurately carried out. Since accurate viterbi decoding can be carried out, it is possible to provide a demodulator 16a which can demodulate the biphase signal BS from the wobble signal WS with a low error rate even for the decreased S/N ratio. Therefore, it is possible to provide an optical disk drive having a very stable operation.

(First Modification of First Embodiment)

Figure 9A:
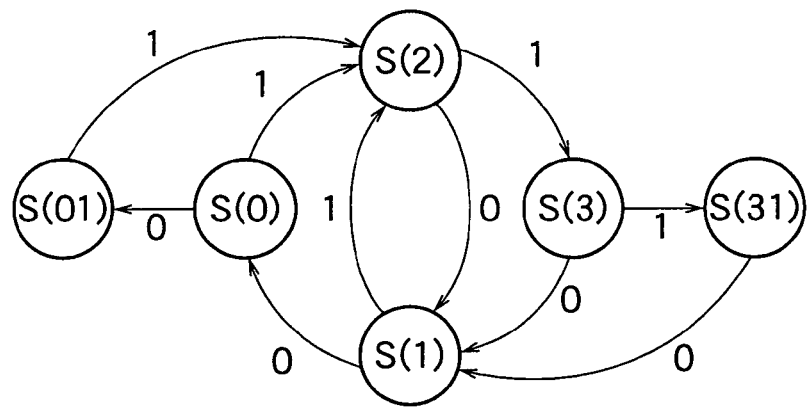
FIG. 9A is a state transition diagram showing an operation of the viterbi decoder according to a first modification of the first embodiment of the present invention.
Figure 9B:
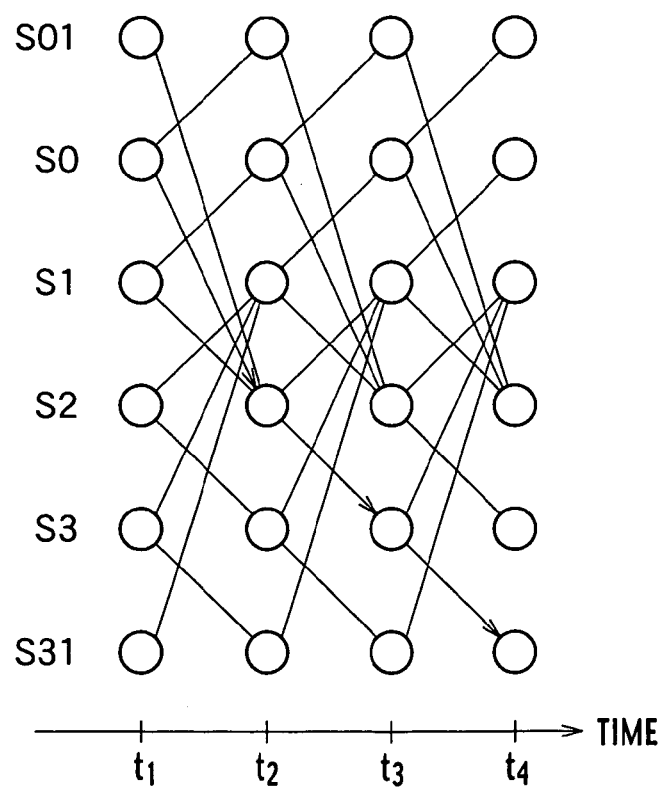
FIG. 9B is a trellis diagram in accordance with the state diagram shown in FIG. 9A.

As shown in FIGS. 9A and 9B, an optical disk drive according to the first modification of the first embodiment differs from the viterbi decoder 31a shown in FIGS. 1 and 2 in that a viterbi decoder performs viterbi decoding based on state transition utilizing regularities of the code sequences of the ATIP signal. Since the ATIP signal has the regularities, the biphase signal BS also has regularities. The state transition diagram shown in FIG. 9A utilizes a run length of the biphase signal BS.

As shown in FIG. 9A, the state transitions according to logic value "1" in the biphase signal BS are S(1), S(2), and S(1), or S(0), S(2), and S(1), or S(01), S(2), and S(3). Since code sequence of the biphase signal BS is "10", a run length according to logic value "1" is 1. When the state transitions are S(0), S(2), S(3), and S(1), or S(01), S(2), S(3), and S(1), or S(1), S(2), S(3), and S(1), the run length according to logic value "1" is 2 because the code sequence of the biphase signal BS is "110". When the state transitions are S(01), S(2), S(3), S(31), and S(1), or S(0), S(2), S(3), S(31), and S(1), or S(1), S(2), S(3), S(31), and S(1), the run length according to logic value "1" is 3 because the code sequence of the biphase signal BS is "1110".

On the other hand, the state transitions according to logic value "0" in the biphase signal BS are S(2), S(1), and S(2), or S(3), S(1), and S(2), or S(31), S(1), and S(2). Since the code sequence of the biphase signal BS is "01", a run length according to logic value "0" is 1. When the state transitions are S(2), S(1), S(0), and S(2), or S(3), S(1), S(0), and S(2), or S(31), S(1), S(0), and S(2), the run length according to logic value "0" is 2 because the code sequence of the biphase signal BS is "001". When the state transitions are S(2), S(1), S(0), S(01), and S(2), or S(3), S(1), S(O), S(01), and S(2), or S(31), S(1), S(O), S(01), and S(2), the run length of logic value "0" is 3 because the code sequence of the biphase signal BS is "0001".

As described above, regarding the code sequence of the biphase signal BS, the run length of logic values "1" and "0" even including the synchronizing signal are only 1, 2, and 3. The viterbi decoder according to the first modification of the first embodiment only generates run lengths 1, 2, and 3 of logic values "1" and "0". The path metric circuit and the path memory circuit according to the first modification of the first embodiment are constituted so as to be identified with the state transition diagram shown in FIG. 9A and the trellis diagram shown in FIG. 9B.

The code sequence, the state, and the reference values are correlated in Table 2.

TABLE 2

| Biphase code sequence | State | Reference value |
| --- | --- | --- |
| (0)00 | S(01) | AV(1 − α) |
| 00 | S(0) | AV(1 − α) |
| 10 | S(1) | AV |
| 01 | S(2) | AV |
| 11 | S(3) | AV(1 + α) |
| (1)11 | S(31) | AV(1 + α) |

As shown in FIG. 10A, it is assumed that the code sequence of the biphase signal is "001110100". In this case, the state transfers t2: S(0), t3: S(2), t4: S(3), t5 S(31), t6: S(1), t7: S(2), t8: S(1), t9: S(0), and t10: S(01). Therefore, the transfers in accordance with the arrows shown in FIG. 9B.

Next, an operation of the demodulator according to the first modification of the first embodiment will be described by using FIGS. 9A to 12. It is assumed that the wobble signal WS contains a waveform distortion. Repeated descriptions for the same operations according to the first modification of the first embodiment which are the same as the first embodiment are omitted.

(A) As shown in "period 2" of FIG. 11A, the code sequence of the biphase signal BS is "001110100". The code sequence of the biphase signal BS which can be taken in "period 2" of FIG. 1A will be shown in FIG. 12(b). However, it is assumed that errors are not contained in periods of BP1, BP2, and BP6. As discussed, the run length of logic values "0" and "1" is limited from 1 to 3.

(B) As shown in FIG. 11D, a waveform of a binarized wobble signal contains an error because the wobble signal WS has a distorted waveform. As shown in FIG. 11G, an output of the period measuring circuit 51 reflects the error. When the output of the period measuring circuit 51 reflects the error, the comparison signal CS also reflects the error. As a result, the biphase signal BS demodulated by the viterbi decoder, as shown in FIG. 11J, reflects the error.

(C) The converted wobble signal CWS shown in FIG. 11F is sampled in synchronization with trailing edges of the clock CLK shown in FIG. 11H. Herein, ideal values shown in FIG. 12(c) are normalized in "1, 0, −1". A sampled signal SS obtained from the converted wobble signal CWS shown in FIG. 11F is "0, 0.5, 0, 1, 0".

(D) Mean square values between the code sequence of "0, 0.5, 0, 1, 0" and the ideal value shown in FIG. 12(c) will be values shown in FIG. 12(D). As shown in FIG. 12(d), the mean square value of a pattern 1 shown in FIG. 12(a) is a minimum. As a result, the viterbi decoder decodes the biphase code sequence of the pattern 1.

According to the first modification of the first embodiment, by setting limitations on the state transition based on regularities of the code sequences of the ATIP signal and the biphase signal, it is possible to reduce demodulation errors. Therefore, even if the S/N ratio of the wobble signal WS is decreased, it is possible to carry out demodulation with extremely high accuracy.

(Second Modification of First Embodiment)

Figure 13:
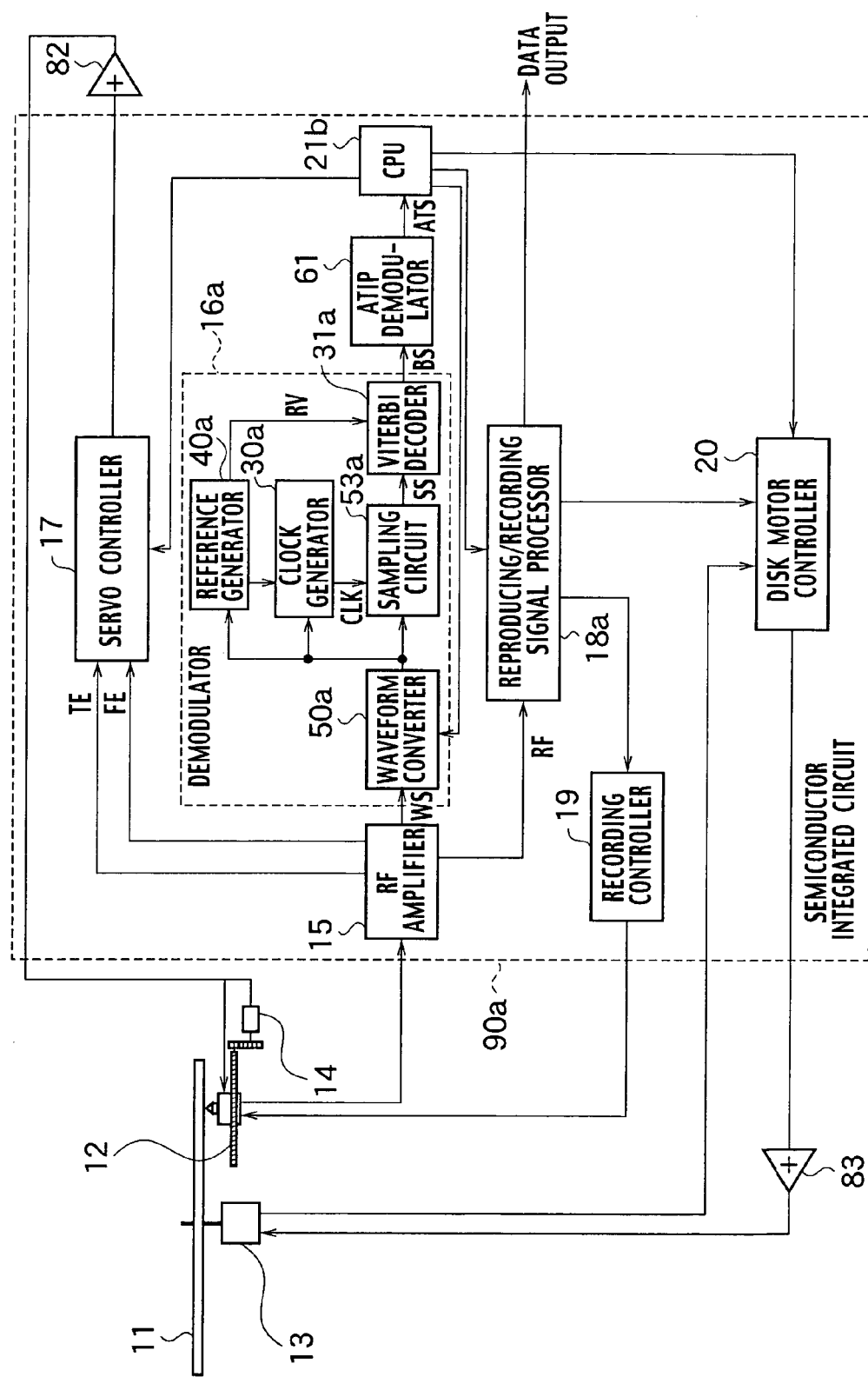
FIG. 13 is a block diagram showing an optical disk drive according to a second modification of the first embodiment of the present invention.

As shown in FIG. 13, an optical disk drive according to the second modification of the first embodiment differs from the optical disk drive shown in FIG. 1 in that the CPU 21b controls an operation of the waveform converter 50a in accordance with a rotational frequency of the optical disk 11. That is, the CPU 21b controls a frequency of the measurement clock and a cut-off frequency of the LPF 52. The optical disk drive according to the second modification of the first embodiment stably converts a waveform of the wobble signal WS even if the rotational frequency of the optical disk 11 changes.

(Second Embodiment)

Figure 14:
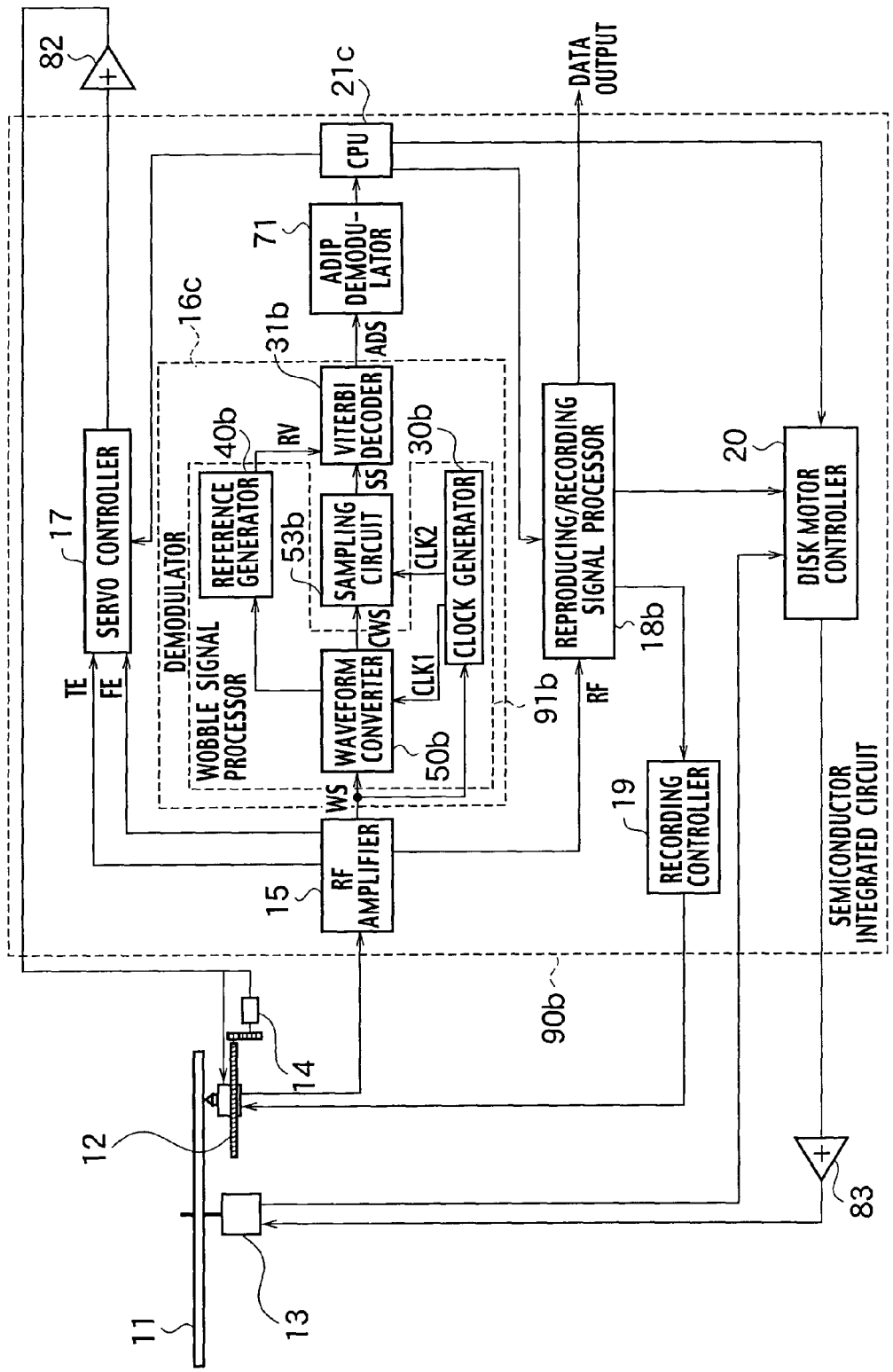
FIG. 14 is a block diagram showing an optical disk drive according to a second embodiment of the present invention.

As shown in FIG. 14, an optical disk drive according to a second embodiment of the present invention differs from the optical disk drive shown in FIG. 1 in that a clock generator 30b generates a first clock CLK1 and a second clock CLK2 based on the wobble signal WS. The waveform converter 50b converts a waveform of the wobble signal WS by equalizing the waveform. The demodulator 16c according to the second embodiment demodulates an ADIP signal ADS as the auxiliary recording signal. An ADIP demodulator 71 is connected between the demodulator 16c and the CPU 21c. The ADIP demodulator 71 converts the ADIP signal ADS into data which the CPU 21c can decode. Other configurations are similar to the optical disk drive shown in FIG. 1. The RF amplifier 15, the demodulator 16c, the ADIP demodulator 71, reproducing/recording signal processor 18b, the recording controller 19, the disk motor controller 20, and the CPU 21c can be monolithically integrated so as to form a semiconductor integrated circuit 90b on a single semiconductor chip.

The reproducing/recording signal processor 18b, in reproducing data after demodulation and error correction, is decoded in accordance with the moving picture experts group (MPEG) 2 standard. As a result, original video data and audio data are reproduced. In recording, data, video and audio data transmitted from an outside source are encoded in accordance with the MPEG2 standard. The encoded data is subjected to error corrective coding and modulation.

Figure 15:
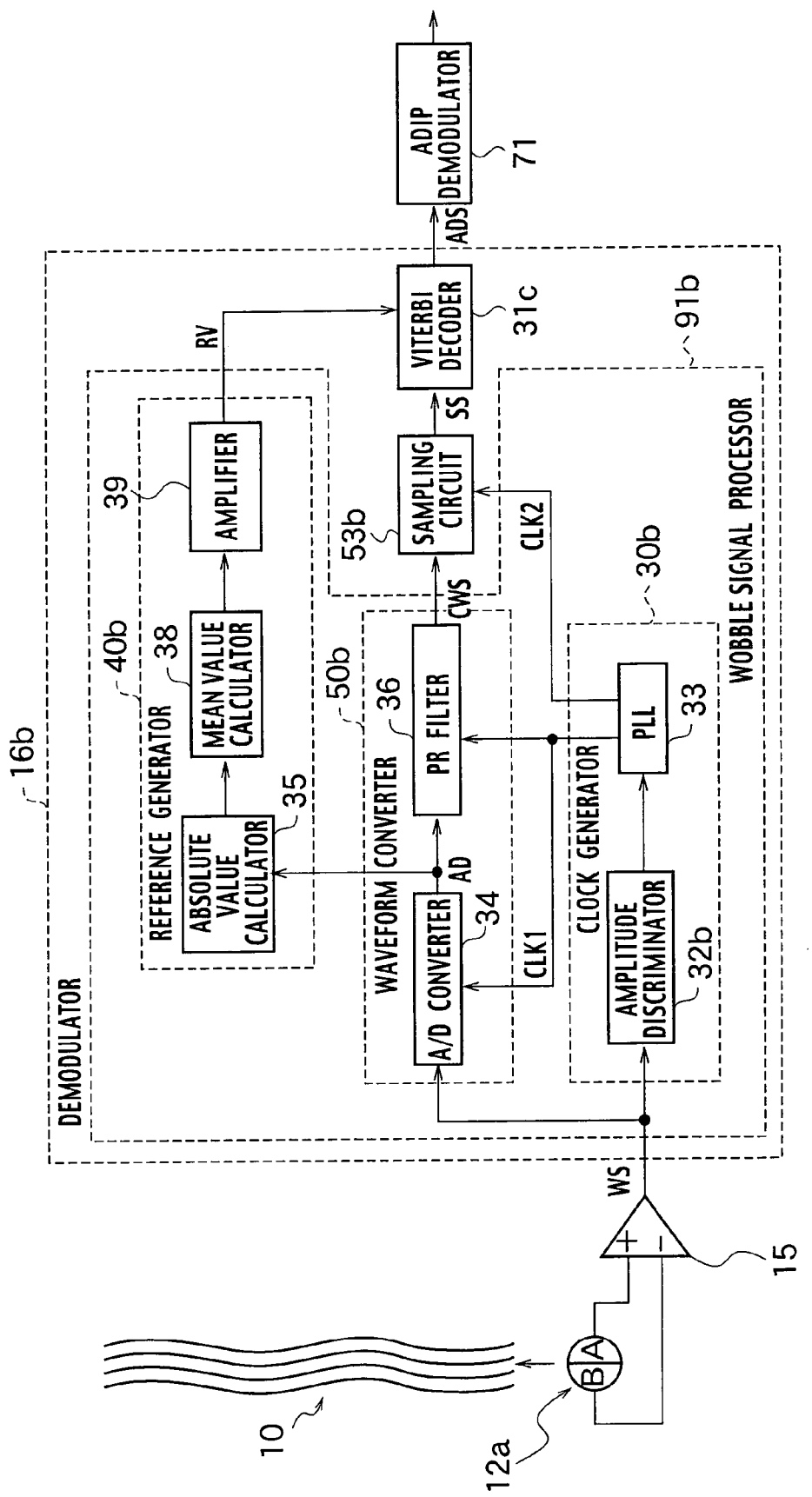
FIG. 15 is a block diagram showing a demodulator according to the second embodiment of the present invention.
Figure 16:
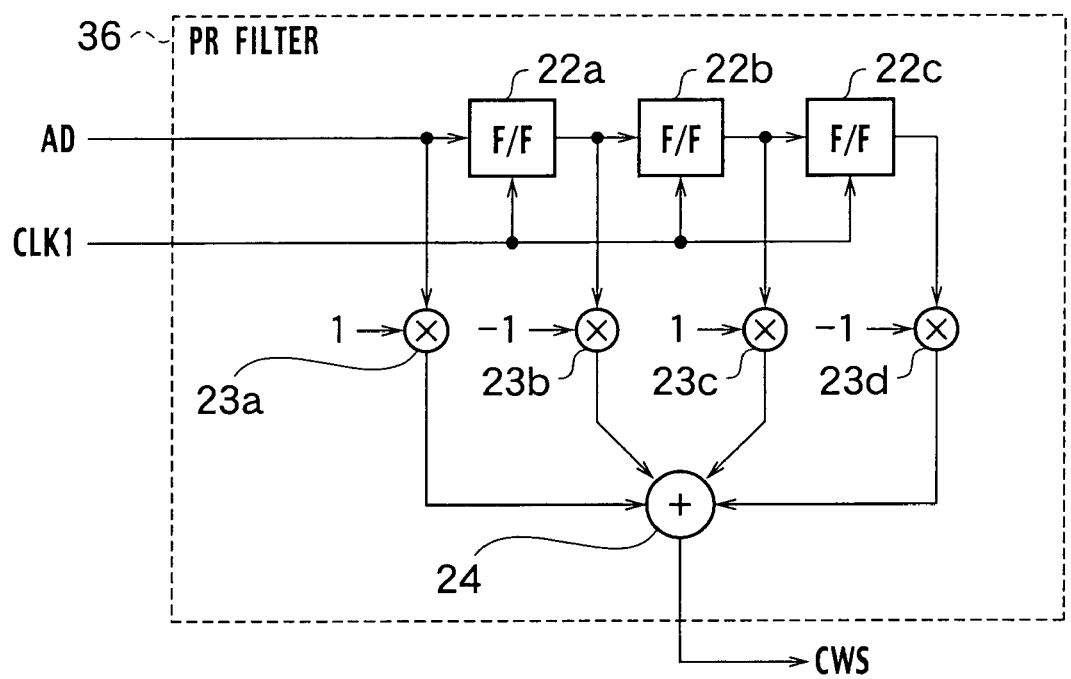
FIG. 16 is a block diagram showing a partial response (PR) filter according to the second embodiment of the present invention.

As shown in FIG. 15, the clock generator 30b includes an amplitude discriminator 32b configured to convert the wobble signal WS into binary code, and a PLL connected to the amplitude discriminator 32b and configured to generate the first clock CLK1 and the second clock CLK2. Trailing edges of the first clock CLK1 are synchronized with leading edges of the binary code, and the first clock CLK has a frequency double the frequency of the wobble signal WS. Phase of the second clock CLK2 is synchronized with the phase of the binary code, and the second clock CLK2 has a frequency equal to the frequency of the wobble signal WS.

As shown in FIG. 15, the waveform converter 50b includes an analog to digital (A/D) converter 34 configured to convert the wobble signal WS into digital data AD in synchronization with leading edges of the first clock CLK1, and a partial response (PR) filter 36 connected to the AID converter 34. The PR filter 36 equalizes a waveform of the digital data AD in synchronization with the first clock CLK1. The reference generator 40b includes an absolute value calculator 35 connected to the A/D converter 34, a mean value calculator 38 connected to the absolute value calculator 35, and an amplifier 39 connected to the mean value calculator 38. The mean value calculator 38 calculates a mean value of absolute values supplied by the absolute value calculator 35. The mean value supplied by the mean value calculator 38 is transmitted to the amplifier 39. The amplifier 39 normalizes the mean value supplied by the mean value calculator 38 to a mean value of the sampled signal SS.

The PR filter 36 includes first, second, and third F/Fs 22a, 22b, and 22c, first, second, third, and fourth multipliers 23a, 23b, 23c, and 23d, and an adder 24. The first F/F 22a receives the digital data AD. The second F/F 22b receives output of the first F/F 22a. The third F/F 22c receives the output of the second F/F 22b. The first multiplier 23a multiplies the digital data AD and logic value "1". The second multiplier 23b multiplies the output of the first F/F 22a and logic value "−1". The third multiplier 23c multiplies the output of the second F/F 22b and logic value "1". The fourth multiplier 23d multiplies the output of the third F/F 22c and logic value "−1". The adder 24 adds outputs of the first, second, third, and fourth multipliers 23a, 23b, 23c, and 23d.

Figure 17:
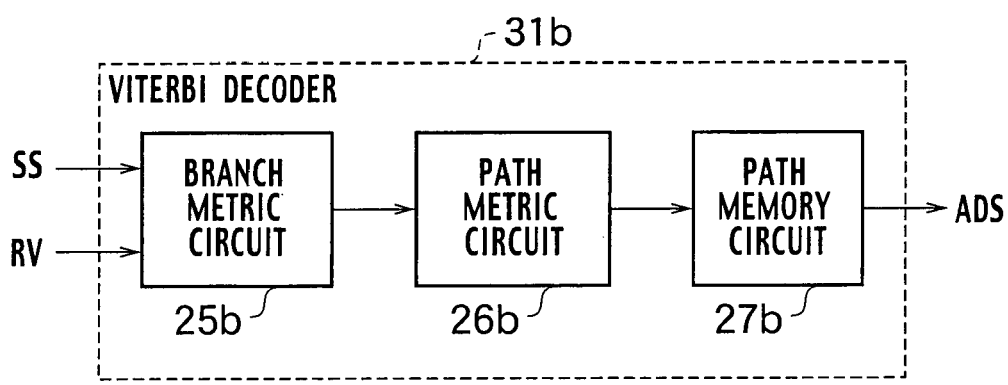
FIG. 17 is a block diagram showing a viterbi decoder according to the second embodiment of the present invention.
Figure 18:
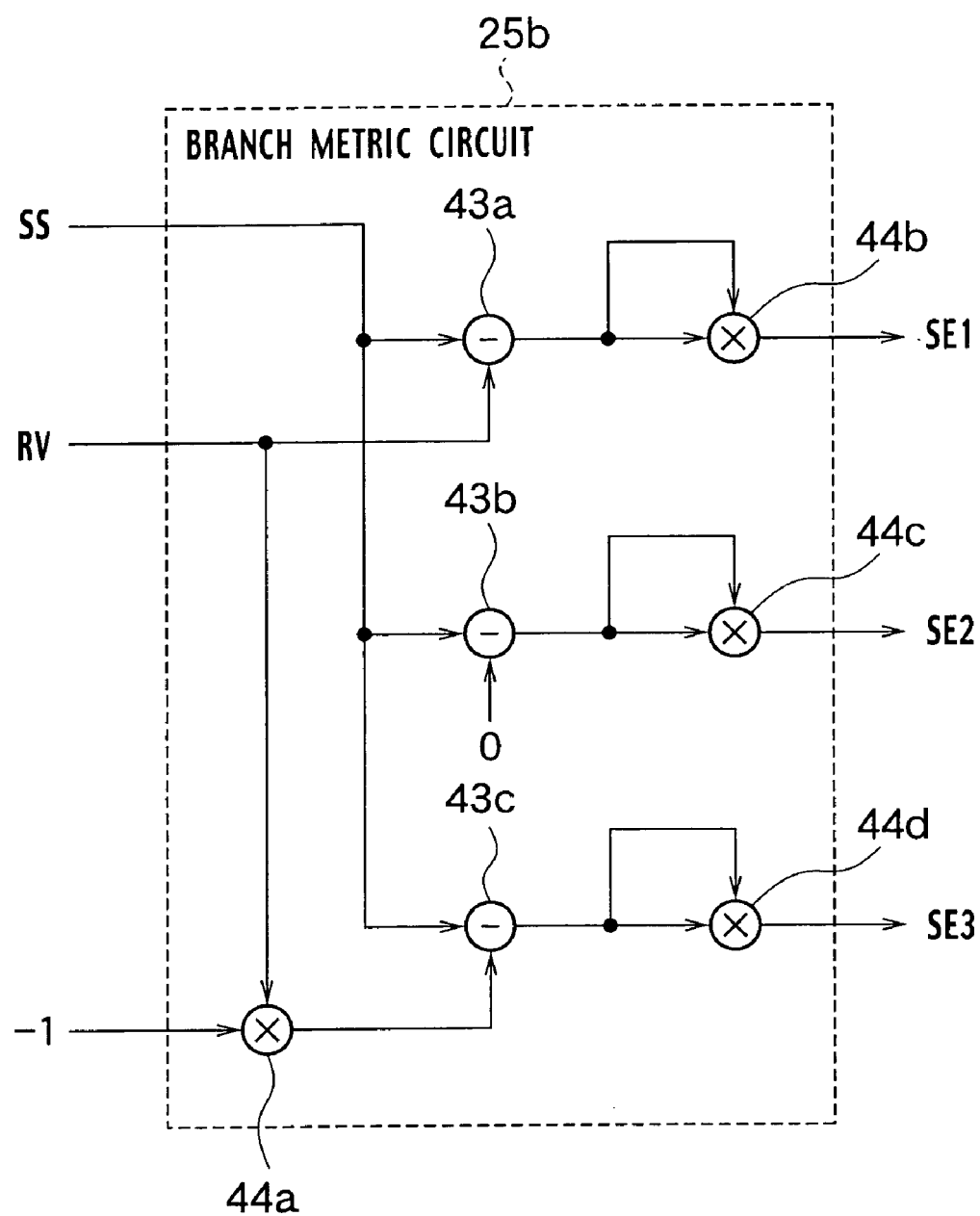
FIG. 18 is a block diagram showing a branch metric circuit according to the second embodiment of the present invention.

As shown in FIG. 18, the branch metric circuit 25b shown in FIG. 17 includes first, second, and third subtracters 43a, 43b, and 43c, and first, second, third, and fourth multipliers 44a, 44b, 44c, and 44d. The first multiplier 44a multiplies the reference value RV and logic value "−1". The first subtracter 43a subtracts the reference value RV from the sampled signal SS. The second subtracter 43b subtracts logic value "0" from the sampled signal SS. The third subtracter 43c subtracts the output of the first multiplier 44a from the sampled signal SS. The second multiplier 44b squares the output of the first subtracter 43a. The third multiplier 44c squares the output of the second subtracter 43b. The fourth multiplier 44d squares the output of the third subtracter 43c.

A code sequence of a converted wobble signal CWS and an ADIP code sequence are correlated to Table 3.

TABLE 3

| ADIP code sequence | state | sampled signal |
|---|---|---|
| 00 | S(0) | −R |
| 10 | S(1) | 0 |
| 01 | S(2) | 0 |
| 11 | S(3) | R |

The PR filter 36 carries out the following equation (1).

$$P[n]=-S(n-3)+S(n-2)-S(n-1)+S(n) \qquad (1)$$

where S(n) is the digital data AD supplied by the A/D converter 34, and P[n] is the converted wobble signal CWS.

Figure 19A:
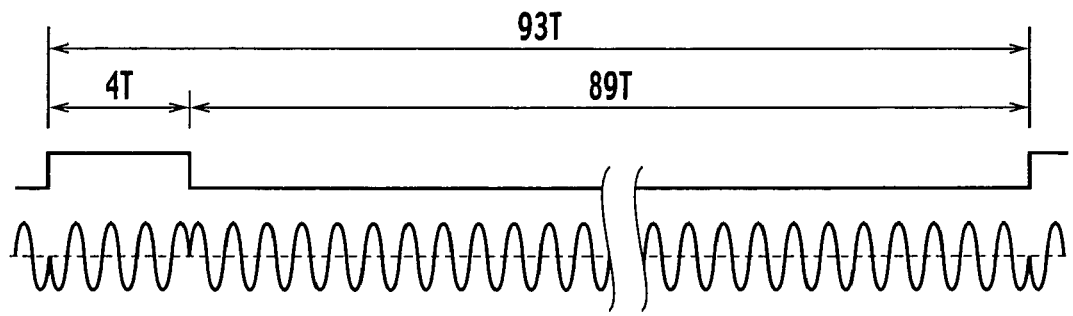
FIGS. 19A to 19C are time charts showing code patterns of an ADIP signal according to the second embodiment of the present invention.
Figure 19B:
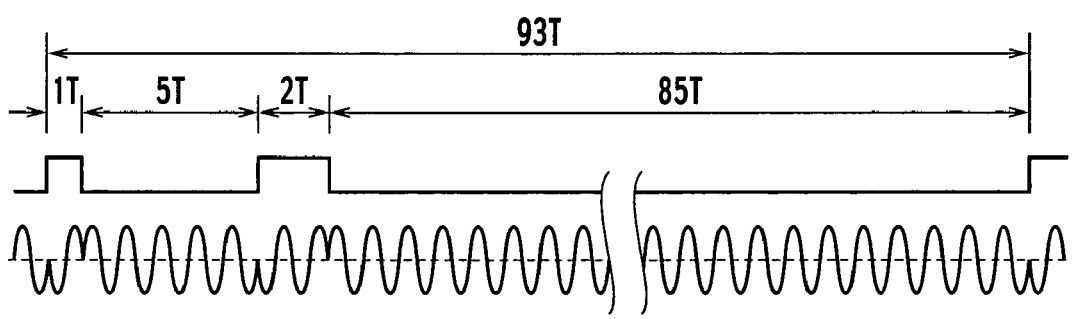
Figure 19C:
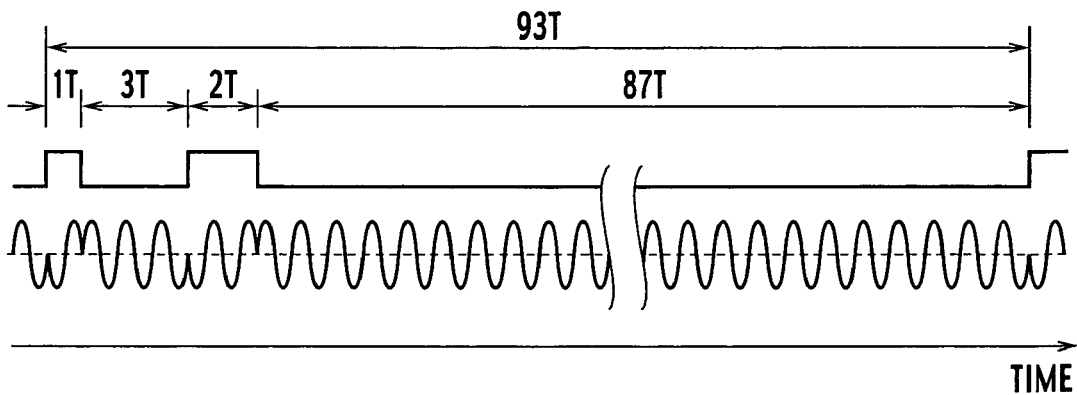

A code sequence of the ADIP signal ADS is shown FIGS. 19A to 19C. In FIGS. 19A to 19C, "T" refers to a carrier period of the wobble signal WS. When the carrier is subjected to phase modulation, the high level period of the ADIP signal ADS is 1T, 2T, and 4T. When the carrier is not subjected to phase modulation, the low level period of the ADIP signal ADS is 3T, 5T, 85T, 87T, and 89T.

Next, an operation of the demodulator 16c according to the second embodiment of the present invention will be described by use of FIGS. 14 to 21D. Repeated descriptions for the same operations according to the second embodiment which are the same as the first embodiment of the present invention are omitted.

(A) It is assumed that the ADIP signal ADS shown in FIG. 10A is recorded on the optical disk 11 shown in FIG. 14. Since the ADIP signal ADS is subjected to PSK modulation, and the RF amplifier 15 generates the wobble signal WS shown in FIG. 20B. The wobble signal WS generated by the RF amplifier 15 is supplied to the A/D converter 34 and the amplitude discriminator 32b.

(B) As shown in FIG. 20C, the amplitude discriminator 32b converts the wobble signal WS into binary code as a slice level of an approximately central level of the amplitude of the wobble signal WS. The slice level is shown in the broken line of FIG. 20B. The binary code determined by the amplitude discriminator 32b is supplied to the PLL 33. The PLL 33 generates the first clock CLK1 and the second clock CLK2 based on the binary code. As shown in FIG. 20D, the first clock CLK1 has trailing edges synchronizing with leading edges of the binary code, and has a frequency double the frequency of the wobble signal WS. As shown in FIG. 20E, the second clock CLK2 has a phase synchronized with the phase of the binary code, and has a frequency equal to the frequency of the wobble signal WS.

(C) The A/D converter 34, as shown in FIG. 20F, converts the wobble signal WS into digital data AD in synchronization with leading edges of the first clock CLK1. When a carrier of the wobble signal WS is A·sin (Ωt), the A/D converter 34 performs A/D conversion in each phase of (2n−3)π−π/2, (2n−2)π−π, (2n−1)π−π/2. As a result, the A/D converter 34 performs the A/D conversion at a peak value of the wobble signal WS shown in FIG. 20B. As shown in FIG. 20F, logic value "1" is correlated to "1" of the binary code shown in FIG. 20C, and logic value "−1" is correlated to logic value "0" of the binary code shown in FIG. 20C. Therefore, the A/D converter 34, as shown in FIG. 20F, generates "1, −1, 1, −1, −1, 1, 1, −1, 1, . . . ". The digital data AD generated by the A/D converter 34 is supplied to the PR filter 36 and the absolute value calculator 35.

(D) The PR filter 36 carries out the following equation (2) obtained by the equation (1).

$$P[n]=-S[(2n-3)\pi-\pi/2]+S[(2n-2)\pi-\pi/2]-S[(2n-1)\pi-\pi/2]+S[2n\ \pi-\pi/2] \qquad (2)$$

where $S[(2n-3)\pi-\pi/2]$, $S[(2n-2)\pi-\pi/2]$, $S[(2n-1)\pi-\pi/2]$, and $S[2n\ \pi-\pi/2]$ are the binary codes supplied by the A/D converter 34, and P[n] is the converted wobble signal CWS. As a result, the PR filter 36 generates a code sequence having a correlation with the binary code such as "4, −4, 4, −4, 2, 0, 0, 0, 2, . . . ". The converted wobble signal CWS supplied by the PR filter 36 is transmitted to the sampling circuit 53b.

(E) As shown in FIG. 20H, the sampling circuit 53b samples converted wobble signal CWS in synchronization with building-up edges of the second clock CLK2. A waveform of the sampled signal SS is exemplified in FIG. 20I. The sampled signal SS shown in FIG. 20H is supplied to the viterbi decoder 31c.

(F) On the other hand, the absolute value calculator 35 calculates an absolute value of the binary code, and supplies the absolute value to the mean value calculator 38. The mean value calculator 38 calculates a mean value of the absolute value. The mean value supplied from the mean value calculator 38 is transmitted to the amplifier 39. The amplifier 39 normalizes the mean value to a mean value of the sampled signal SS because the phase of the sampled signal SS is converted by the PR filter 36. Therefore, by quadrupling the average, the normalization to a reference value of the viterbi decoder 31c can be achieved. The reference value is supplied to the viterbi decoder 31c.

(G) As shown in FIG. 18, the reference value is supplied to the first subtracter 43a and the first multiplier 44a. The first multiplier 44a multiplies the reference value RV and logic value "−1". The first subtracter 43a subtracts the reference value RV from the sampled signal SS, and generates an error between the reference value RV and the sampled signal SS. The second subtracter 43b subtracts logic value "0" from the sampled signal SS, and generates an error between logic value "0" and the sampled signal SS. The third subtracter 43c subtracts the output of the first multiplier 44a from the sampled signal SS, and generates an error between output of the first multiplier 44a and the sampled signal SS. The second multiplier 44b squares output of the first subtracter 43a, and generates a first squared error SE1. The third multiplier 44c squares the output of the second subtracter 43b, and generates a second squared error SE2. The fourth multiplier 44d squares the output of the third subtracter 43c, and generates a third squared error SE3. The first, second, and third squared error SE1, SE2, and SE3 are supplied to the path metric circuit 26b shown in FIG. 17.

(H) Herein, it is assumed that the ADIP signal ADS shown in FIG. 21A is recorded on the optical disk 11. The converted wobble signal CWS generated by the PR filter 36 is exemplified in 21C. As shown at time t1 of FIG. 21D, a state is S(0) shown in FIG. 5A in accordance with the Table 3. The ADIP signal ADS is changed to logic value "1" from logic value "0" at time t1. When the ADIP signal is changed to logic value "1" from logic value "0", the state transfers S(0) to S(2). The ADIP signal ADS is a logic value "1" at time t2. As a result, the state transfers S(2) to S(1). The path metric circuit 26b and path memory circuit 27b demodulates the ADIP signal ADS based on such a state transition.

As described above, according to the second embodiment, it is possible to provide a demodulator which can accurately demodulate the ADIP signal ADS even if the S/N ratio thereof is decreased. The A/D converter 34 subjects a peak value of the wobble signal to A/D conversion, and a reference value is generated from the A/D converted wobble signal in viterbi decoding. Accordingly, it is possible to obtain a more optimal reference value even if fluctuation occurs in wobble signal amplitude. Further, it is possible to obtain a more optimal reference value even if phase deviation occurs between the wobble signal and the first clock CLK1 which is the sampling clock thereof. Additionally, the A/D converted wobble signal is phase-converted into three pattern values through the PR filter 36. As a result, since a width of the sampled signal can be set large, demodulation can be positively carried out.

(First Modification of Second Embodiment)

Figure 22A:
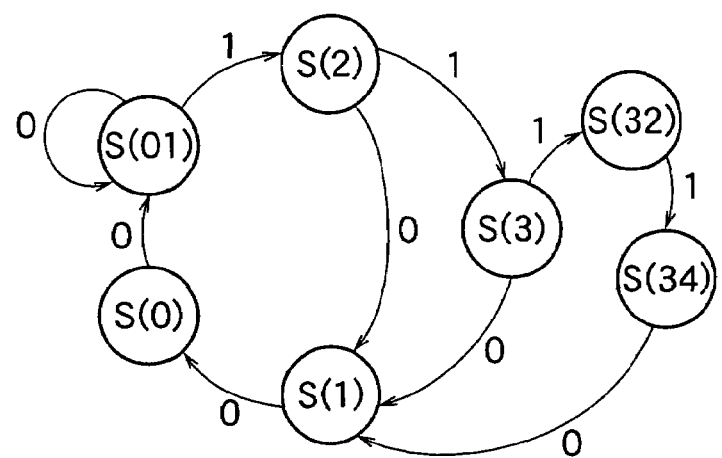
FIG. 22A is a state transition diagram showing an operation of the viterbi decoder according to a first modification of the second embodiment of the present invention.
Figure 22B:
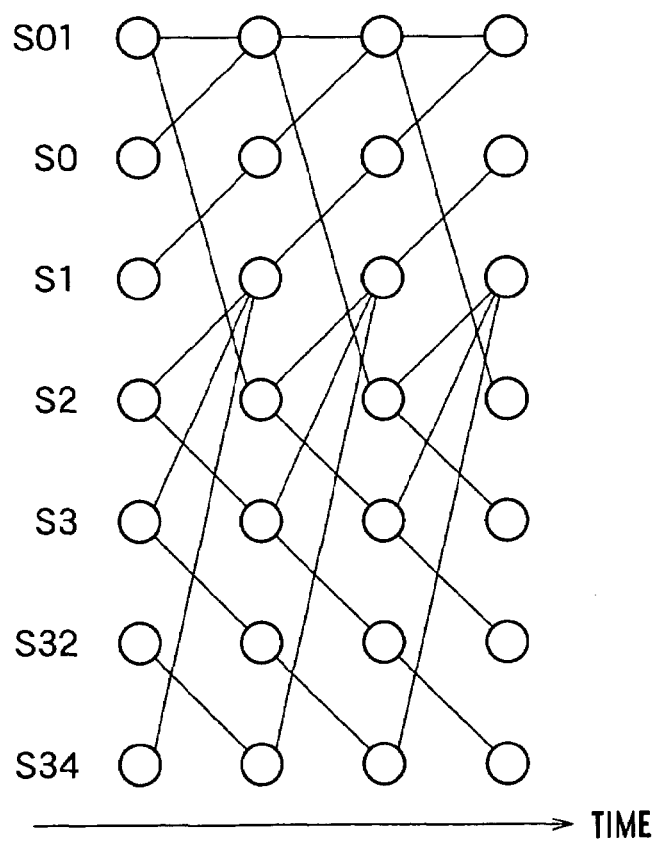
FIG. 22B is a trellis diagram in accordance with the state diagram shown in FIG. 22A.

As shown in FIGS. 22A and 22B, a viterbi decoder according to a first modification of the second embodiment performs viterbi decoding based on state transition utilizing regularities of the code sequences of the ADIP signal ADS. A run length of logic value "1" is 1, 2, and 4. A run length of logic value "0" is 3. Therefore, state transition diagram shown in FIG. 22A omits state transition transferring S(1) to S(2) shown in FIG. 5A. The viterbi decoder according to the first modification of the second embodiment are constituted so as to be identified with the state transition diagram shown in FIG. 22A and the trellis diagram shown in FIG. 22B.

As shown in FIG. 22A, regarding the state transition of logic value "1" of the ADIP signal ADS, when state transition is S((0)1), S(2), and S(1), the ADIP code sequence is "1000 . . . ", and the run length of logic value "1" is 1. When state transition is S((0)1), S(2), S(3), and S(1), the ADIP code sequence is "1100 . . . ", and the run length of logic value "1" is 2. When state transition is S((0)1), S(2), S(3), S(32), S(34), and S(1), an ADIP code sequence is "11110 . . . ", and the run length of logic value "1" is 4. Since no other transition is possible, the run length of the logic value "1" are limited to 1, 2, and 4. Accordingly, the viterbi decoder according to the first modification of the second embodiment never generates demodulation signals other than those of the run length 1, 2, and 4 of logic value "1". In other words, the viterbi decoder of the first modification of the second embodiment generates a positively demodulation signal among those of run length 1, 2, and 4 of logic value "1". On the other hand, state transition of logic value "0" of the ADIP signal ADS is S(2), S(3) or S(34), S(1), S(0), and S((0)1), and the run length of logic value "0" is limited to 3 or higher.

The ADIP code sequence, the state, and the reference values are correlated in Table 4.

TABLE 4

| ADIP code sequence | State  | sampled signal |
|--------------------|--------|----------------|
| (00)00             | S(01)  | −R             |
| 00                 | S(0)   | −R             |
| 10                 | S(1)   | 0              |
| 01                 | S(2)   | 0              |
| 11                 | S(3)   | R              |
| (1)11              | S(32)  | R              |
| (11)11             | S(33)  | R              |

Next, an operation of the demodulator according to the first modification of the second embodiment will be described by using FIGS. 22A to 24D.

(A) It is assumed that an ADIP signal ADS exemplified in FIG. 24A is superposed on the optical disk 11. As shown in "period 3" and "period 4" of FIG. 23B, a wobble signal WS contains distorted waveform because of decreasing of S/N ratio. As shown in FIG. 23C, a waveform of a binarized wobble signal BWS contains an error because the wobble signal WS has the distorted waveform. A first clock CLK1 shown in FIG. 23D and a second clock CLK2 shown in FIG. 23E are generated based on the binarized wobble signal BWS.

(B) The data sequence of the digital data AD exemplified in FIG. 23F. As shown in FIG. 23F, the digital data AD contains logic value other than logic values "1" and "−1".

(C) The data sequence of a converted wobble signal CWS exemplified in FIG. 23G. The waveform of a sampled signal SS exemplified in FIG. 23I. Herein, an ideal waveform of the sampled signal SS exemplified in FIG. 23J.

(D) When an ADIP signal ADS is demodulated, the waveform of a converted wobble signal CWS exemplified in FIG. 24C. Therefore, the code sequence of a sampled signal SS is "−R, −R, 0, +R, . . . ". As a result, the state transfers S(01), S(01), S(01), S(2), S(3), S(32), . . . , in accordance with the table 4 and state transition diagram shown in FIG. 22A. When the state transition is S(01), S(01), S(01), S(2), S(3), S(32), . . . , the ADIP code sequence is "000011 . . . " based on the table 4.

As described above, according to the first modification of the second embodiment, by setting limitations on the state transition based on regularities of the code sequences of the ADIP signal ADS, it is possible to reduce demodulation errors.

(Second Modification of Second Embodiment)

Figure 25:
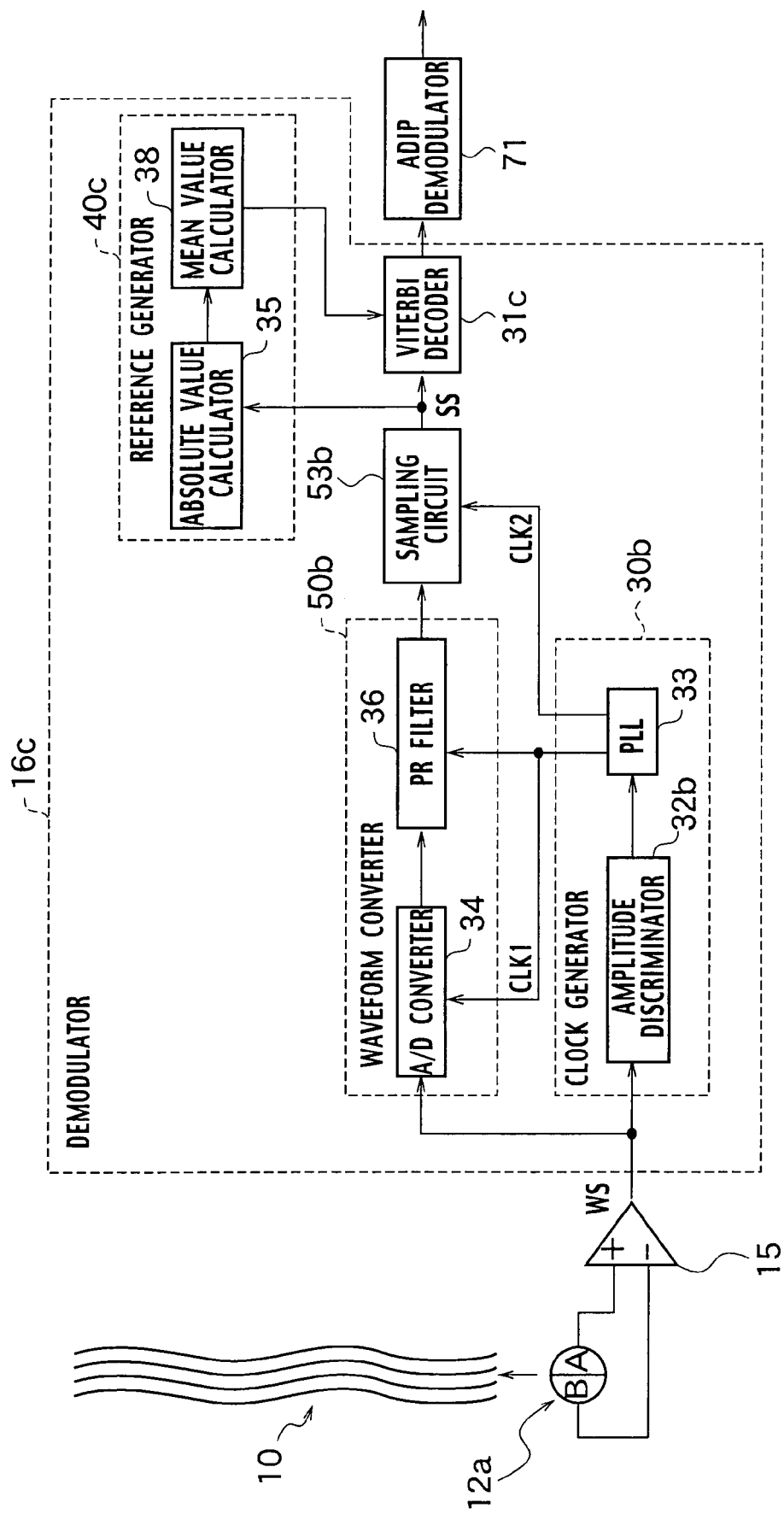
FIG. 25 is a block diagram showing a demodulator according to a second modification of the second embodiment of the present invention.

As shown in FIG. 25, a demodulator 16c according to second modification of the second embodiment differs from the demodulator 16b in that the reference generator 40c includes an absolute value calculator 35 connected to the sampling circuit 53b, and mean value calculator 38 connected between the absolute value calculator 35 and the viterbi decoder 31c. The reference generator 40c shown in FIG. 25 can omit the amplifier 39 shown in FIG. 15 because the reference generator 40c doesn't perform normalization by generating the reference value RV based on the sampled signal SS.

(Other Embodiments)

Various modifications will become possible for those skilled in the art after receiving the teachings of the present disclosure without departing from the scope thereof.

The first and second embodiments have been described by being classified into the CD-R/RW drive and the DVD+RW drive. However, it is obvious that the invention can be applied to a so-called "combo drive" which can carry out reproducing/recording both on the CD-R/RW and the DVD+RW.

Moreover, the second embodiment has been described by using the DVD+RW drive as the optical disk drive. However, it is also obvious that the invention can be applied to the DVD-R/RW. For example, in the DVD-R/RW, a wobble clock is generated from the wobble signal by a wobble PLL. The demodulators 16a, 16c of the first and second embodiments can be applied when the wobble clock is generated from a distorted wobble signal.

The second modified example of the first embodiment has been described based on the capability of controlling the measurement clock of the period measuring circuit 51 and the cutoff frequency of the LPF 52 by the CPU 21b. Thus, the demodulators 16a, 16c of the first and second embodiments can flexibly deal with changes in the state of the optical disk and environmental changes.

What is claimed is:

1. A demodulator comprising:
   a wobble signal processor configured to convert a waveform of a wobble signal, and to generate a clock and a reference value based on a converted wobble signal;
   a sampling circuit configured to sample the converted wobble signal by using the clock, and to generate a sampled signal; and
   a viterbi decoder configured to decode an auxiliary recording signal superposed on an optical disk by using the reference value and the sampled signal.

2. The demodulator of claim 1, wherein the wobble signal processor comprises:
   a waveform converter configured to measure a cycle of the wobble signal, and to generate the converted wobble signal;
   a reference generator configured to calculate a mean value of an amplitude of the converted wobble signal, and to generate first, second, and third reference values based on the mean value; and
   a clock generator configured to generate the clock based on the converted wobble signal and the mean value.

3. The demodulator of claim 2, wherein the waveform converter comprises:
   an amplitude discriminator configured to binarize the wobble signal, and to generate a binarized wobble signal;
   a period measuring circuit configured to measure periods between edges of the binarized wobble signal based on a measurement clock; and
   a low-pass filter configured to smooth the output of the period measuring circuit.

4. The demodulator of claim 2, wherein the reference generator comprises:
   a mean value calculator configured to calculate the mean value; and
   a frequency shift circuit configured to generate the first, second, and third reference values.

5. The demodulator of claim 3, wherein the clock generator comprises:
   a comparator configured to compare the converted wobble signal with the mean value, and to generate a comparison signal; and
   a PLL configured to multiply the comparison signal, and to generate the clock.

6. The demodulator of claim 4, wherein the frequency shift circuit comprises:
   a first shift circuit configured to calculate the first reference value based on the mean value; and
   a second shift circuit configured to calculate the third reference value based on the mean value.

7. The demodulator of claim 4, wherein the viterbi decoder comprises:
   a branch metric circuit configured to generate first, second, and third squared errors based on the first, second, and third reference values;
   a path metric circuit configured to calculate a survivor path based on the first, second, and third squared errors; and
   a path memory circuit configured to store a code sequence in accordance with the survivor path, and to merge the code sequence as a biphase signal.

8. The demodulator of claim 7, wherein the branch metric circuit comprises:
   a first subtracter configured to calculate an error between the sampled signal and the first reference value, and to generate a first error signal;
   a second subtracter configured to calculate an error between the sampled signal and the second reference value, and to generate a second error signal;
   a third subtracter configured to calculate an error between the sampled signal and the third reference value, and to generate a third error signal;
   a first multiplier configured to square the first error signal;
   a second multiplier configured to square the second error signal; and
   a third multiplier configured to square the third error signal.

9. The demodulator of claim 1, wherein the wobble signal processor comprises:
   a clock generator configured to generate a first clock and a second clock based on the wobble signal;
   a waveform converter configured to convert the waveform of the wobble signal by equalizing the waveform; and
   a reference generator configured to generate the reference value.

10. The demodulator of claim 9, wherein the clock generator comprises:
    an amplitude discriminator configured to convert the wobble signal into binary code; and
    a PLL configured to generate the first clock and the second clock.

11. The demodulator of claim 10, wherein trailing edges of the first clock are synchronized with leading edges of the binary code, and the first clock has a frequency double the frequency of the wobble signal.

12. The demodulator of claim 10, wherein phase of the second clock is synchronized with the phase of the binary code, and the second clock has a frequency equal to the frequency of the wobble signal.

13. The demodulator of claim 12, wherein the sampling circuit samples the converted wobble signal in synchronization with leading edges of the second clock.

14. The demodulator of claim 11, wherein the waveform converter comprises:
    an A/D converter configured to convert the wobble signal into digital data in synchronization with leading edges of the first clock; and
    a partial response filter configured to equalize a waveform of the digital data in synchronization with the first clock.

15. The demodulator of claim 14, wherein the reference generator comprises:
    an absolute value calculator configure to calculate an absolute value of the digital data;
    a mean value calculator configure to calculate a mean value of the absolute value; and
    an amplifier configured to normalize the mean value to an mean value of the sampled signal.

16. The demodulator of claim 14, wherein the reference generator comprises:
    an absolute value calculator configure to calculate an absolute value of the sampled signal; and
    a mean value calculator configure to calculate a mean value of the absolute value.

17. The demodulator of claim 14, wherein the partial response filter comprises:
    a first F/F configured to receive the digital data;
    a second F/F configured to receive output of the first F/F;
    a third F/F configured to receive output of the second F/F;
    a first multiplier configured to multiply the digital data and logic value "1";
    a second multiplier configured to multiply the output of the first F/F and logic value "−1"; a third multiplier configured to multiply the output of the second F/F and logic value "1"; a fourth multiplier configured to multiply the output of the third F/F and logic value "−1"; and an adder configured to add outputs of the first, second, third, and fourth multipliers.

18. The demodulator of claim 9, wherein the viterbi decoder comprises:

a branch metric circuit configured to generate first, second, and third squared errors based on the reference value and the sampled signal;

a path metric circuit configured to calculate a survivor path based on the first, second, and third squared errors; and a path memory circuit configured to store a code sequence in accordance with the survivor path, and to merge the code sequence as an ADIP signal.

19. A semiconductor integrated circuit comprising:

a wobble signal processor integrated on a semiconductor chip and configured to convert a waveform of a wobble signal, and to generate a clock and a reference value based on a converted wobble signal;

a sampling circuit integrated on the semiconductor chip and configured to sample the converted wobble signal by using the clock, and to generate a sampled signal; and a viterbi decoder integrated on the semiconductor chip and configured to decode an auxiliary recording signal superposed on an optical disk by using the reference value and the sampled signal.

20. An optical disk drive comprising:

a pickup configured to receive light reflected from an optical disk, the reflected light generated by irradiating a laser beam on the optical disk;

an RF amplifier configured to amplify a wobble signal generated by the pickup from the received light;

a demodulator configured to generate a reference value and a sampled signal based on the wobble signal, and to subject an auxiliary recording signal superposed on the optical disk to viterbi decoding by using the reference value and the sampled signal;

a servo controller configured to control an operation of the pickup;

a reproducing/recording signal processor configured to carry out signal processing for reproducing or recording with the pickup; and a recording controller configured to control recording of a recording signal from the reproducing/recording signal processor onto the optical disk.

* * * * *